United States Patent [19]
Everhart et al.

[11] Patent Number: 5,494,744
[45] Date of Patent: Feb. 27, 1996

[54] METHOD OF APPLYING A PROTEIN COATING TO A SUBSTRATE AND ARTICLE THEREOF

[75] Inventors: Dennis S. Everhart; Kristi L. Kiick-Fischer, both of Alpharetta, Ga.

[73] Assignee: Kimberly-Clark Corporation, Neenah, Wis.

[21] Appl. No.: 321,485

[22] Filed: Oct. 12, 1994

[51] Int. Cl.⁶ .................................................. B32B 15/00
[52] U.S. Cl. .......................... 427/337; 427/180; 427/256; 427/384; 427/414; 427/430.1; 427/542; 427/557; 427/560; 427/545; 427/600; 428/339; 428/474.4; 428/480; 428/522; 428/523
[58] Field of Search ............................. 427/542, 557, 427/560, 595, 600, 346, 384, 430.1, 180, 256, 414; 428/267, 284, 289, 332, 336, 474.4, 480, 522, 523, 339

[56] References Cited

U.S. PATENT DOCUMENTS

| | | | |
|---|---|---|---|
| 2,262,770 | 11/1941 | La Piana | 260/6 |
| 2,262,771 | 11/1941 | La Piana | 260/6 |
| 2,310,795 | 2/1943 | La Piana et al. | 106/146 |
| 2,453,752 | 11/1948 | La Piana et al. | 260/6 |
| 2,979,422 | 4/1961 | Bersin et al. | 117/106 |
| 3,104,154 | 9/1963 | Morimoto et al. | 18/54 |
| 3,188,233 | 6/1965 | Powers et al. | 117/140 |
| 3,202,748 | 8/1965 | Morio Nake et al. | 264/194 |
| 3,494,775 | 2/1970 | Coscia et al. | 106/124 |
| 3,690,925 | 9/1972 | Morris | 117/76 T |
| 4,761,161 | 8/1988 | Potschke | 8/543 |
| 5,055,316 | 10/1991 | Hoffman et al. | 427/2 |
| 5,208,075 | 5/1992 | Kroner et al. | 427/389.9 |
| 5,229,172 | 7/1993 | Cahalan et al. | 427/536 |
| 5,260,396 | 11/1993 | Kroner et al. | 527/201 |

FOREIGN PATENT DOCUMENTS

| | | |
|---|---|---|
| 538901 | 4/1957 | Canada . |
| 0199171 | 10/1986 | European Pat. Off. . |
| 2364524 | 7/1974 | Germany . |
| 4108170 | 9/1992 | Germany . |
| 42-16065 | 9/1967 | Japan . |
| 45-34391 | 11/1970 | Japan . |
| 45-34390 | 11/1970 | Japan . |
| 49-48590 | 12/1974 | Japan . |
| 07170904 | 10/1982 | Japan . |
| 425689 | 3/1935 | United Kingdom . |

OTHER PUBLICATIONS

Theodore H. Meltzer, *Filtration in the Pharmaceutical Industry*, Marcel Dekker, Inc., New York, 1987, pp. 310–314. (No month avail).

Zaverio M. Ruggeri, "Mechanisms of Shear–induced Platelet Adhesion and Aggregation," *Thrombosis and Haemostasis–Journal of the International Society on Thrombosis and Haemostasis*, Jul. 1, 1993, Schattauer Stuttgart, New York, 1993, pp. 119–123.

*Primary Examiner*—Bernard Pianalto
*Attorney, Agent, or Firm*—Karl V. Sidor

[57] ABSTRACT

Disclosed is a method of coating a permeable sheet with amphiphilic proteins, the method including the steps of: 1) providing a permeable sheet having a plurality of individual exposed surfaces, at least a portion of which having relatively low surface energies; 2) providing an aqueous solution containing amphiphilic proteins, the solution having a relatively high surface tension; and 3) contacting the solution containing amphiphilic proteins under shear stress conditions with the matrix of fibrous material so that at least a portion of the amphiphilic proteins are adsorbed onto at least some individual exposed surfaces. Also disclosed is a protein-coated permeable sheet composed of: 1) a permeable sheet having a plurality of individual exposed surfaces, at least a portion of which having relatively low surface energies; and 2) amphiphilic proteins adsorbed onto at least some individual exposed surfaces to define a gradient distribution of amphiphilic protein coating along at least one dimension of the permeable sheet.

52 Claims, 15 Drawing Sheets

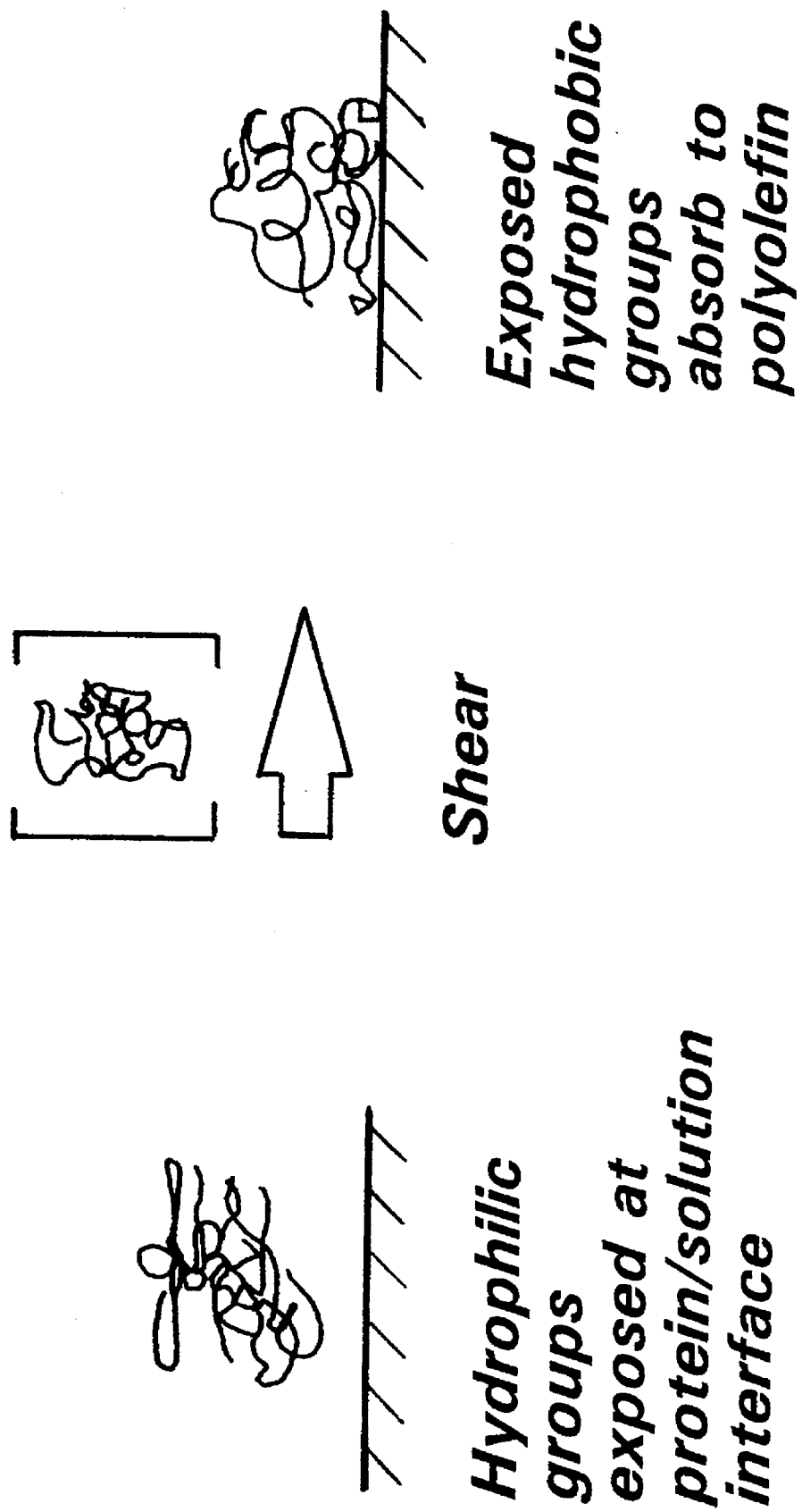

METHOD OF APPLYING A PROTEIN COATING TO A SUBSTRATE AND ARTICLE THEREOF

FIELD OF THE INVENTION

This invention relates to a method of applying a protein coating to a substrate. The invention also relates to a protein-coated substrate.

BACKGROUND OF THE INVENTION

Sheets of apertured films, woven fabrics and nonwoven materials are widely used in many types of products such as, for example, personal care products, garments, medical fabrics and the like. Some sheets made from certain inexpensive raw materials could have an even wider range of applications in these products if the sheets could be designed to have enhanced properties or attributes.

For example, polyolefins are widely used in the manufacture of sheets of apertured films, woven fabrics, and nonwoven materials. Many types of polyolefin sheets tend to be hydrophobic and relatively inert. That is, the low surface free energy of polyolefins (e.g., polypropylene) and their relatively chemically inert nature render many unmodified polyolefins ill-suited for providing attributes other than those based on hydrophobic interactions.

In the past, chemical coatings and/or internal additives have been added to sheets of materials to impart desired properties. Many of these coatings and/or additives present problems related to cost, effectiveness, durability and/or the environment.

It has been proposed that biofunctional materials (e.g., proteins) can be deposited from solutions onto different substrates (i.e., sheets of materials) to modify the surface properties of the substrates and/or serve as a functionalized surface that can be chemically reactive. However, many of the economically desirable substrates (e.g., substrates formed of polymers such as polyolefins) have surfaces that are unsuitable for the rapid and inexpensive deposition of biofunctional materials, especially when durable, tightly-bound coatings of satisfactory adherence are desired.

It has also been proposed that surfaces of these substrates can be modified to improve the adherence of biofunctional materials. Some suggested surface modification techniques involve: 1) irradiating the surface of a polymeric material in the presence of oxygen to create active sites and then chemically grafting a polymer onto the active sites; 2) providing an organic surface coating by plasma discharge in the presence of a plasma polymerizable, halogenated hydrocarbon gas; and 3) treating (e.g., oxidizing) the surface of a substrate so that it has a hydrophilic character with a high amount of cation-exchange groups.

Such treatments can be complex, expensive, environmentally unsuitable, leave trace amounts of undesirable compounds, unsuited for high-speed manufacturing processes, and/or cause degradation of the substrate. In particular, a trend toward increasing environmental awareness and government regulation in the areas of air, water, product and food quality make some of these treatments relatively unattractive. Furthermore, these treatments fail to address the need for a practical method of depositing a durable, tenacious coating of proteins on the unmodified surface (or surfaces) of a relatively inert, hydrophobic substrate.

Thus, there is still a need for a simple method of producing a durable and chemically reactive protein coating on an unmodified, relatively inert, hydrophobic substrate. A need exists for a practical method of producing a durable and chemically reactive protein coating on an unmodified, relatively inert, polyolefin substrate. A need exists for a pattern or gradient of surface modification on a relatively inert, hydrophobic substrate. There is also a need for a protein-coated fibrous and/or apertured film-like material having a protein coating such that the resulting coated material can generally be considered wettable. A need also exists for fibrous and/or apertured film-like substrates formed from a relatively inert, hydrophobic material (e.g., a polyolefin) that are coated with a readily available, inexpensive, natural, renewable and nontoxic material, especially if such a coated material can be produced in a high-speed manufacturing process. Meeting these needs are important since it is both economically and environmentally desirable to substitute relatively complex chemical surface modification and/or functionalization of inexpensive (and often recyclable) substrates with inexpensive, readily available natural materials.

DEFINITIONS

As used herein, the term "amphiphilic protein" refers to proteins having both hydrophobic regions and hydrophilic regions. For example, amphiphilic proteins may be selected from classes of globular and/or random coil proteins. As another example, amphiphilic proteins may be milk proteins. As a further example, amphiphilic proteins may include proteins such as those found in bovine milk including, but not limited to, various caseins and whey proteins.

As used herein, the term "relatively low surface energy" refers to surface energies (i.e., surface free energies) attributed to materials that are not generally considered to be water wettable. Generally speaking, such materials have a surface energy of less than about 45 dynes per centimeter (dynes/cm) as determined in accordance with critical surface tension of wetting techniques described by Bennet, M. K. and Zisman, W. A.; *Relation of Wettability by Aqueous Solutions to the Surface Constitution of Low Energy Solids;* J. Phys. Chem., pps. 1241–1246, Volume 63 (1959). Many such materials have a surface energy of ranging from about 29 to about 35 dynes/cm.

As used herein, the term "relatively high surface tension" refers to a level of attractive force in a liquid exerted by the molecules below the surface upon those at the surface/air interface, resulting from the high molecular concentration of a liquid compared to the low molecular concentration of a gas. Relatively high surface tensions are characteristic of, for example, some aqueous liquids and/or aqueous solutions having little or no added surfactants or other agents that reduce the surface tension. Surface tension may be determined from measurements of the contact angle of sessile drops using a goniometer such as, for example goniometer model No. 100-00 115 (equipped with videocamera) available from Rame-Hart, Inc., or by methods such as, for example, DuNouy ring methods. Relatively high surface tension for the purposes of the present invention is a surface tension of at least about 45 dynes/cm. Desirably, the surface tension is greater than 45 dynes/cm.

As used herein, the term "shear stress conditions" refers to conditions under which a shearing stress (force per unit area) is applied to a liquid. As an example, for a given volume of a liquid, increasing the rate at which the liquid penetrates or passes through a relatively permeable sheet such as, for example, a polyolefin nonwoven fibrous web (i.e., by decreasing the exposure time) results in an increased shear stress at the fiber/liquid interface. In this case, a long exposure time generally indicates little or no shear stresses and a short exposure time generally indicates shear stress conditions. Shear stress conditions may occur in liquid flow having generally laminar or turbulent flow characteristics.

As used herein, the term "adsorbed" refers to a type of adhesion which takes place at the surface of a solid in contact with another medium (e.g., a liquid), resulting in the accumulation or increased concentration of molecules from that medium in the immediate vicinity of the surface.

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding, wet-forming and various bonded carded web processes.

As used herein, the term "spunbonded web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly dispersed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. Pat. No. 5,213,881, entitled "A Nonwoven Web With Improved Barrier Properties".

As used herein, the term "apertured film-like material" refers to a generally flat or planar layer of material which has been punched, drilled, apertured, stretched, perforated, embossed, patterned, crinkled and/or otherwise processed so that it may have relatively gross or visible openings with or without a pattern or texture in the thickness dimension (i.e., Z-direction) of the material. Exemplary apertured film-like materials include, but are not limited to, perf-embossed films, textured apertured films, reticulated apertured films, contoured apertured films, film-nonwoven apertured laminates, and expanded plexi-filamentary films.

As used herein, the term "sheet" refers to a material that can be a woven fabric, knit fabric, nonwoven fabric or film-like material (e.g., an apertured film-like material).

As used herein, the term "solution" refers to any relatively uniformly dispersed mixture of one or more substances (e.g., solute) in one or more other substances (e.g., solvent). Generally speaking, the solvent may be a liquid such as, for example, water and/or mixtures of liquids. The solvent may contain additives such as salts, acids, bases, viscosity modifiers, preservatives, disinfectants, anti-microbial agents and the like. The solute may be any material adapted to uniformly disperse in the solvent at the appropriate level, (e.g., ionic level, molecular level, colloidal particle level or as a suspended solid). For example, a solution may be a uniformly dispersed mixture of ions, of molecules, of colloidal particles, or may even include mechanical suspensions.

As used herein, the terms "permeable" and "permeability" refer to the ability of a fluid, such as, for example, a gas to pass through a particular porous material. Permeability may be expressed in units of volume per unit time per unit area, for example, (cubic feet per minute) per square foot of material (e.g., ($ft^3$/minute/$ft^2$)). Permeability may be determined utilizing a Frazier Air Permeability Tester available from the Frazier Precision Instrument Company and measured in accordance with Federal Test Method 5450, Standard No. 191A, except that the sample size was 8"×8" instead of 7"×7". Although permeability is generally expressed as the ability of air or other gas to pass through a permeable sheet, sufficient levels of gas permeability may correspond to levels of liquid permeability to enable the practice of the present invention. For example, a sufficient level of gas permeability may allow an adequate level of liquid to pass through a permeable sheet with or without assistance of a driving force such as, for example, an applied vacuum or applied gas pressure. Generally speaking, a permeable sheet may have a permeability of at least about 20 cubic feet per minute per square foot (cfm/$ft^2$), as measured for a substantially dry sheet prior to processing. It is contemplated that a sheet having a permeability of less than about 20 cfm/$ft^2$, as measured for a substantially dry sheet prior to processing, could be used successfully in the practice of the present invention with (or in some cases without) assistance of a driving force such as, for example, an applied vacuum or applied gas pressure. As an example, a permeable sheet may have a permeability of from about 25 to over 200 cfm/$ft^2$, as measured for a substantially dry sheet prior to processing. As another example, a permeable sheet may have a permeability of from about 35 to about 150 cfm/$ft^2$, as measured for a substantially dry sheet prior to processing.

As used herein, the term "superabsorbent" refers to absorbent materials capable of absorbing at least 10 grams of aqueous liquid (e.g. water, saline solution or synthetic urine Item No. K-C 399105 available from PPG Industries) per gram of absorbent material while immersed in the liquid for 4 hours and holding the absorbed liquid while under a compression force of up to about 1.5 pounds per square inch.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The problems described above are addressed by the present invention which is directed to a method of coating a permeable sheet with amphiphilic proteins. The method includes the steps of: 1) providing a permeable sheet having a plurality of individual exposed surfaces, at least a portion of which having relatively low surface energies; 2) providing an aqueous solution containing amphiphilic proteins, the solution having a relatively high surface tension; and 3) contacting the solution containing amphiphilic proteins under shear stress conditions with the permeable sheet so that at least a portion of the amphiphilic proteins are adsorbed onto at least some individual exposed surfaces.

The permeable sheet may be a matrix of fibrous material. The matrix of fibrous material may be, but is not limited to, one or more woven fabrics, knit fabrics, nonwoven fabrics and combinations of the same. The matrix of fibrous material may further include one or more secondary materials.

The matrix of fibrous material may be a nonwoven fabric such as, for example, nonwoven webs of meltblown fibers, nonwoven webs of continuous spunbond filaments and bonded carded webs. In an embodiment of the invention, the nonwoven web of meltblown fibers may further include one or more secondary materials selected from the group consisting of textile fibers, wood pulp fibers, particulates and superabsorbent materials.

The fibrous material may be formed from a thermoplastic polymer. For example, thermoplastic polymer may be selected from polyolefins, polyamides and polyesters. The polyolefin may be selected from polyethylene, polypropylene, polybutene, ethylene copolymers, propylene copolymers, and butene copolymers and blends of the same.

In one aspect of the invention, at least a portion of the fibrous material may be a multi-component or bi-component material selected from multi-component or bi-component fibers and multi-component or bi-component filaments. It is contemplated that at least a portion, if not all, of these fibers may be textured by use of an expanding agent.

The permeable sheet may be an apertured, film-like material. The apertured, film-like material may include, but is not limited to perf-embossed films, one or more textured apertured films, reticulated apertured films, contoured apertured films, film-nonwoven apertured laminates, expanded plexi-filamentary films and combination of the same. The apertured film-like material may further include one or more secondary materials.

The apertured film-like material may be formed from a thermoplastic polymer. For example, the thermoplastic polymer may be selected from polyolefins, polyamides and polyesters. If the polymer is a polyolefin, it may be selected from polyethylene, polypropylene, polybutene, ethylene copolymers, propylene copolymers, and butene copolymers and blends of the same. The permeable sheet may be composed of combinations of one or more matrices of fibrous material and apertured, film-like material.

According to the present invention, the aqueous solution may have an amphiphilic protein concentration of less than about 10 percent by weight. Desirably, the aqueous solution has an amphiphilic protein concentration greater than about 0.01 up to about 6 percent by weight.

In an aspect of the present invention, the aqueous solution may be exposed to shear stress conditions such that it has a Reynold's number of at least about 200. For example, the aqueous solution may be exposed to shear stress conditions such that it has a Reynold's number of at least about 400. In another aspect of the invention, the aqueous solution may be in the form of a foam (i.e., a colloidal system of gas dispersed in a liquid) when contacted with the matrix of fibrous material.

The method of the present invention may further include the step of washing or rinsing the coated permeable sheet with an aqueous liquid having a relatively high surface tension. The method of the present invention may further include the step of drying the coated permeable sheet. For example, the material treated as described above may be dried using infra-red radiation, yankee dryers, steam cans, microwaves, hot-air and/or through-air drying techniques, and ultrasonic energy.

The method of the present invention may further include the step of recontacting a solution containing amphiphilic proteins under shear stress conditions with the permeable sheet so that an additional portion of amphiphilic proteins are adsorbed onto at least some individual exposed surfaces.

In the practice of the present invention amphiphilic proteins may be adsorbed onto at least some individual exposed surfaces thereby defining a patterned protein coating on the permeable sheet. The present invention also encompasses a method wherein amphiphilic proteins are adsorbed onto a substantial portion of individual exposed surfaces having relatively low surface energies to define a relatively uniform coating. In another aspect of the invention, amphiphilic proteins may be adsorbed onto at least some individual exposed surfaces to define a gradient distribution of amphiphilic protein coating along at least one dimension of the permeable sheet.

The method of the present invention further includes the step of adding one or more secondary materials to the coated permeable sheet. For example, the secondary materials may include particulates and or fibrous material. Suitable fibrous material may include pulp, synthetic and/or natural fibers and the like. Suitable particulate material may include activated carbon, zeolites, clays, superabsorbent particulates and the like.

The present invention encompasses a protein-coated permeable sheet including: 1) a permeable sheet having individual exposed surfaces, at least a portion of which having relatively low surface energies; and 2) amphiphilic proteins adsorbed onto at least some individual exposed surfaces to define a gradient distribution of amphiphilic protein coating along at least one dimension of the permeable sheet. In one embodiment, the gradient distribution of amphiphilic protein coating may be along at least two dimensions of the permeable sheet.

The permeable sheet may be a matrix of fibrous material. The matrix of fibrous material may be, but is not limited to, one or more woven fabrics, knit fabrics, nonwoven fabrics and combinations of the same. The matrix of fibrous material may further include one or more secondary materials. The permeable sheet may be an apertured, film-like material. The apertured, film-like material may include, but is not limited to perf-embossed films, one or more textured apertured films, reticulated apertured films, contoured apertured films, film-nonwoven apertured laminates, expanded plexi-filamentary films and combination of the same. The apertured film-like material may further include one or more secondary materials.

According to the present invention, the protein-coated permeable sheet may have a basis weight of from about 6 to about 400 grams per square meter (gsm). For example, the protein-coated sheet may have a basis weight of from about 12 to about 250 grams per square meter. As a further example, the protein-coated sheet may have a basis weight of from about 17 to about 102 grams per square meter.

The present invention encompasses a multi-layer material including at least two layers of the protein-coated sheet described above. The present invention also encompasses a multi-layer material including at least one layer of the protein-coated sheet described above and at least one other layer. The other layer may be selected from woven fabrics, knit fabrics, bonded carded webs, continuous spunbond filament webs, meltblown fiber webs, films, apertured films, and combinations thereof. In an aspect of the present invention, the protein-coated permeable sheet may include amphiphilic proteins adsorbed onto at least some individual exposed surfaces thereby defining a patterned protein coating on the permeable sheet. The protein-coated permeable sheet may include a coating of amphiphilic proteins uniformly adsorbed onto individual exposed surfaces that is present in only discrete portions of the permeable sheet.

Generally speaking, the amphiphilic proteins may be selected from classes of globular proteins and/or random coil proteins. For example, the amphiphilic proteins may be milk proteins. Desirably, the amphiphilic proteins may include proteins such as those found in bovine milk including, for example, various caseins and whey proteins.

In one aspect of the invention, the coating of amphiphilic proteins may be made up of multiple layers. In another aspect of the invention, the thickness of the protein coating may range from about 1 nanometer to about 1 micron. For example, the thickness of the protein coating ranges from about 5 nanometers to about 900 nanometers. As a further example, the thickness of the protein coating may range from about 10 nanometers to about 500 nanometers.

According to the present invention, the protein-coated permeable sheet may have a critical surface tension of wetting greater than about 45 dynes per centimeter. For example, the protein-coated sheet may have a critical surface tension of wetting greater than about 50 dynes per centimeter. As a further example, the protein-coated sheet may have a critical surface tension of wetting greater than about 60 dynes per centimeter.

The present invention encompasses a protein-coated fibrous material including: 1) a matrix of fibrous material having individual exposed surfaces, at least a portion of which having relatively low surface energies; and 2) amphiphilic proteins adsorbed onto at least some individual exposed surfaces to define a gradient distribution of amphiphilic protein coating along at least one dimension of the matrix of fibrous material. In one embodiment, the gradient distribution of amphiphilic protein coating may be along at least two dimensions of the matrix.

One embodiment of the present invention encompasses a protein-coated film-like material. This material includes: 1) an apertured film-like material having individual exposed surfaces, at least a portion of which having relatively low surface energies; and 2) amphiphilic proteins adsorbed onto at least some individual exposed surfaces to define a gradient distribution of amphiphilic protein coating along at least one dimension of the apertured film-like material. For example, the gradient distribution of amphiphilic protein coating may be along at least two dimensions of the apertured film-like material.

The present invention also encompasses a method of coating a permeable sheet with amphiphilic proteins at discrete locations. The method includes the steps of: 1) providing a permeable sheet having a plurality of individual exposed surfaces, at least a portion of which having relatively low surface energies; 2) providing an aqueous solution containing amphiphilic proteins, the solution having a relatively high surface tension; 3) contacting the solution containing amphiphilic proteins under shear stress conditions at discrete locations with the material so that at least a portion of the amphiphilic proteins are adsorbed onto at least some individual exposed surfaces within the discrete locations; and 4) washing the coated fibrous material with a liquid to define a pattern of protein coating on the permeable sheet and/or throughout the permeable sheet.

Yet another embodiment of the invention encompasses a method of coating a permeable sheet with amphiphilic proteins to produce a gradient distribution of amphiphilic proteins on and/or throughout the permeable sheet. The method includes the steps of: 1) providing a permeable sheet having a plurality of individual exposed surfaces, at least a portion of which having relatively low surface energies; 2) providing an aqueous solution containing amphiphilic proteins, the solution having a relatively high surface tension; and 3) contacting the solution containing amphiphilic proteins under shear stress conditions with the permeable sheet so that at least a portion of the amphiphilic proteins are adsorbed onto at least some individual exposed surfaces to define a gradient distribution of amphiphilic protein coating along at least one dimension of the permeable sheet.

The present invention also encompasses a protein-coated permeable sheet composed of: 1) a matrix of fibrous polyolefin material having individual exposed surfaces, at least a portion of which having relatively low surface energies; and 2) amphiphilic proteins adsorbed onto at least some individual exposed surfaces to define a gradient distribution of amphiphilic protein coating along at least one dimension of the matrix of fibrous polyolefin material.

BRIEF DESCRIPTION OF THE DRAWINGS

FIG. 3 is an illustration of an exemplary effect of shear forces on protein adsorption.

DETAILED DESCRIPTION OF THE INVENTION

Figure 1:
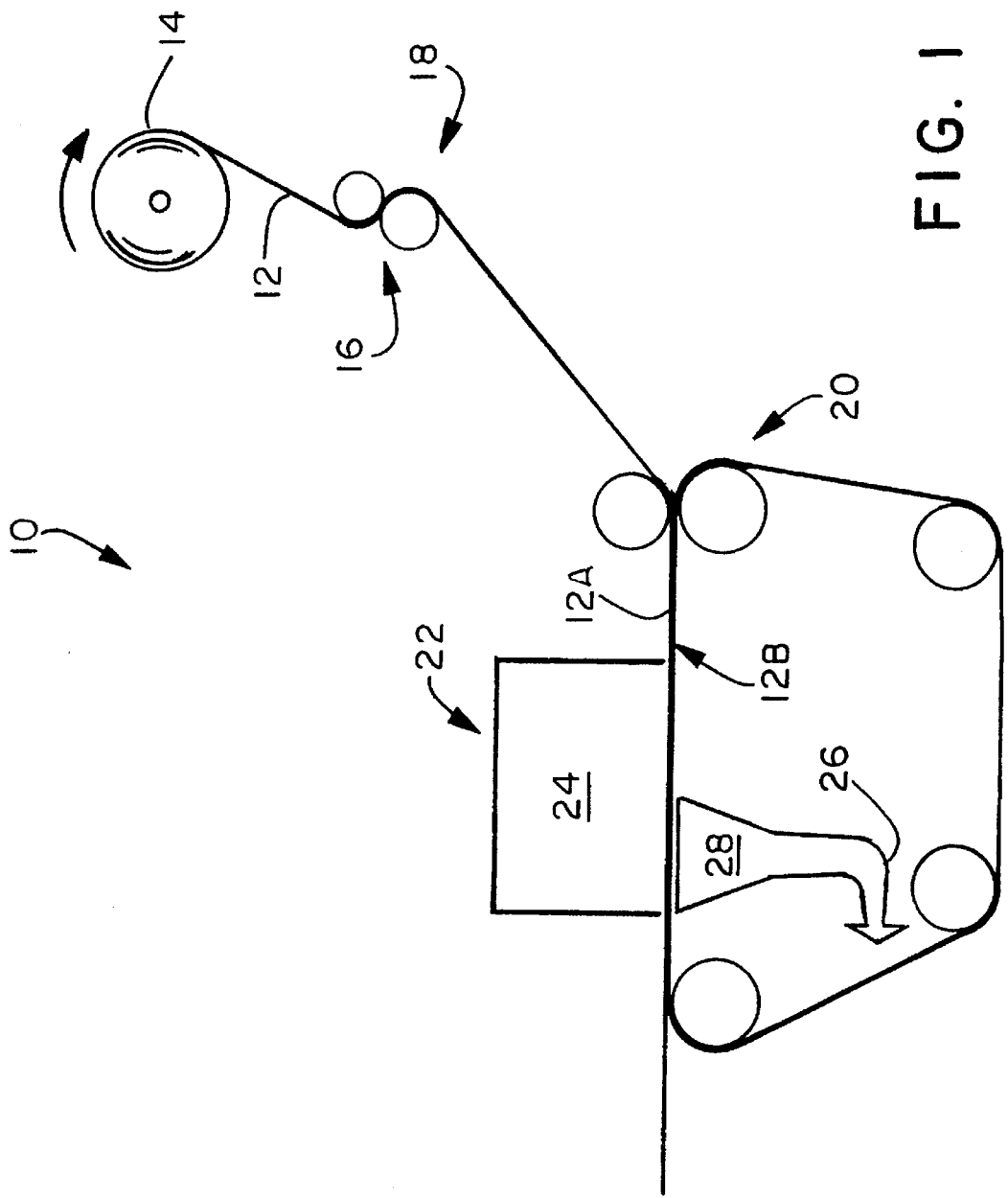
FIG. 1 is an illustration of an exemplary method of coating individual exposed surfaces of a permeable sheet with amphiphilic proteins.

Referring to the drawing and in particular to FIG. 1, there is shown, not necessarily to scale, at 10 an exemplary method of coating individual exposed surfaces of a permeable material (e.g., a matrix of fibrous material or an apertured film-like material) with amphiphilic proteins. While the invention will be described in connection with desired or preferred embodiments, it will be understood that it is not intended to limit the invention to those embodiments.

According to the present invention, a permeable sheet 12 is unwound from a supply roll 14 and travels in the direction indicated by the arrow associated therewith as the supply roll 14 rotates in the direction of the arrows associated therewith. The permeable sheet 12 may be formed by one or more sheet making processes and passed directly into the process 10 without first being stored on a supply roll 14. Exemplary sheet-making processes include processes such as meltblowing processes, spunbonding processes, bonded-carded web-making processes, wet-laying processes, apertured film-forming processes, and the like.

The permeable sheet may be passed through a pre-treatment station to modify the structure of the sheet. For example, the sheet may be calendered with a flat roll, point bonded or pattern bonded roll and/or aperturing roll in order to achieve desired strength, functional and/or textural properties. Although it is not necessary for the successful deposition of the protein coating on the permeable sheet in the practice of the present invention, it is contemplated that at least a portion of a surface of the sheet could be modified by various known surface modification techniques prior to entering the continuous process of coating individual exposed surfaces of the permeable sheet with amphiphilic proteins. Exemplary surface modification techniques include, for example, chemical etching, chemical oxidation, ion bombardment, plasma treatments, flame treatments, heat treatments, and/or corona discharge treatments.

The permeable sheet may be an apertured film-like material. For example, the apertured film-like material may be selected from perf-embossed films, textured apertured films, reticulated apertured films, contoured apertured films, film-nonwoven apertured laminates, and expanded plexi-filamentary films.

Alternatively and/or additionally the permeable sheet may be a matrix of fibrous material such as one or more woven fabrics, knit fabrics or nonwoven fabrics. That is, the permeable sheet may be either an apertured film-like material, a matrix of fibrous material or any suitable combination of the same. If the permeable sheet is a nonwoven fabric, it may be a nonwoven fibrous web such as, for example, a bonded carded web, spunbond web, web of meltblown fibers, fibrous batt, fibrous mat and/or multi-ply fibrous web containing the same type of fibrous web or a multi-ply fibrous web containing different types of fibrous webs. If the permeable sheet is a web of meltblown fibers, it may include meltblown microfibers. These nonwoven webs may be formed from thermoplastic polymers or thermoset polymers. If the nonwoven web is formed from a polyolefin, the polyolefin may be polyethylene, polypropylene, polybutene, ethylene copolymers, propylene copolymers and butene copolymers. The fibers and/or filaments may be formed from blends that contain various pigments, additives, strengthening agents, flow modifiers and the like. Such fabrics are described in U.S. Pat. Nos. 4,041,203, 4,374,888, and 4,753,843, the contents of which are incorporated herein by reference. Those patents are assigned to the Kimberly-Clark Corporation, the assignee of the present invention.

The permeable sheet may be a nonwoven web that may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, activated carbon, silica, and/or hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

If the permeable sheet is a nonwoven web, the fibrous material in the nonwoven web may be joined by interfiber bonding to form a coherent web structure. Interfiber bonding may be produced by entanglement between individual meltblown fibers, carded fibers, spunbond filaments and/or other fibrous materials. Some fiber entangling is inherent in the meltblown process, bonding-carding process and/or spunbond process but may be generated or increased by processes such as, for example, hydraulic entangling or needlepunching. Alternatively and/or additionally a bonding agent may be used to increase the desired bonding. If at least a portion of the fibrous material in the permeable sheet is cellulosic fibrous material, some interfiber bonding may be attributable to "paper" bonding.

The permeable sheet (prior to processing) may have a basis weight ranging from about 6 gsm to about 400 gsm. For example, the permeable sheet may have a basis weight ranging from about 12 gsm to about 250 gsm. Desirably, the permeable sheet may have a basis weight ranging from about 17 gsm to about 102 gsm. It is contemplated that, after processing, any number of treated permeable sheets may be joined together or treated permeable sheets may be joined to other materials to form a consolidated material that may have a basis weight within the range of 6 gsm to 400 gsm or even greater (e.g., 400 gsm or more).

The permeable sheet 12 passes through the nip 16 of an S-roll arrangement 18 in a reverse-S path. From the S-roll arrangement 18, the permeable sheet 12 passes to a means for continuously advancing 20 the permeable sheet throughout the protein-coating process. Generally speaking, the means for continuously advancing 20 the permeable sheet may be, for example, a moving foraminous belt, a permeable fabric, netting, webbing or the like. It is contemplated that the permeable sheet 12 may be self-supporting and need not be transported on a moving belt.

The permeable sheet 12 then passes under a means for providing an aqueous solution containing amphiphilic proteins. The aqueous solution of amphiphilic proteins should have a relatively high surface tension (i.e., the aqueous solution of amphiphilic proteins should have a surface tension of about 45 dynes/cm or greater). The means for providing an aqueous solution containing amphiphilic proteins distributes the aqueous solution substantially across and onto a first surface 12A of the continuously advancing permeable sheet.

According, to the invention, the means for depositing the aqueous solution containing amphiphilic proteins under shear stress conditions may be composed of at least one liquid distribution element 24. For example, multiple liquid distribution elements 24 may be arranged in series. The liquid distribution element 24 may be a spillway adapted to produce a stream or shower of the aqueous solution of amphiphilic proteins so that it is under shear stress conditions as it contacts the permeable sheet. The liquid distribution element 24 may also be one or more nozzles and/or orifices which sprays, squirts, jets or otherwise conveys the aqueous solution of amphiphilic proteins so that it is under shear stress conditions as it contacts the permeable sheet. It is contemplated that the liquid distribution element may be composed of a reservoir of the aqueous solution of amphiphilic proteins designed so that the permeable sheet passes over either an interior or exterior surface across one or more openings or orifices which provides contact with the aqueous solution of amphiphilic proteins under shear stress conditions. It is also contemplated that the liquid distribution element may be a reservoir of the aqueous solution of amphiphilic proteins into which the permeable sheet passes at a rate of travel through the reservoir such that shear stress conditions are created at the interface between one or more surfaces of the permeable sheet and the aqueous solution of amphiphilic proteins.

In one embodiment of the invention, the liquid distribution element may be composed of a reservoir and a spillway adapted to produce a relatively uniform distribution of the aqueous solution of amphiphilic proteins to produce a layer of liquid on top of the permeable sheet. A vacuum may be applied simultaneously with the deposition of the aqueous solution to generate shear stress conditions in the aqueous solution of amphiphilic proteins as it passes through the permeable sheet. It is contemplated that application of vacuum may be delayed so that it is not simultaneous with the deposition of aqueous solution. Generally speaking, the vacuum level should be sufficient to draw the aqueous solution through the permeable sheet under shear stress conditions. As an example, the vacuum level may be greater than about 60 inches of water. As another example, the vacuum level may range from about 60 to about 270 or more inches of water.

As discussed above, the means for applying a vacuum 26 to the second surface of the continuously advancing permeable sheet are located near the liquid deposition element 24. Generally speaking, the vacuum means 26 may be composed of at least one vacuum element 28. Multiple vacuum elements 28 may be arranged in series. The vacuum element 28 may be a conventional vacuum channel or groove such as, for example, a vacuum slot. The vacuum means 26 should be adapted to handle flow rates/volumes of aqueous solution generally corresponding to the flow rates/volumes out of the liquid deposition means 22.

The liquid deposition means 22 and the vacuum means 26 may be configured to deposits the aqueous solution on the permeable sheet 12 in the general form of shapes, patterns, figures, alpha-numeric characters, words, spots, pictures and the like. The vacuum means may contain a variety of configurations such as, for example, unevenly spaced vacuum slots or slits (or shaped openings) designed to produce a gradient deposition. It is contemplated that the liquid deposition means 22 and the vacuum means 26 could be configured to provide intermittent deposition of aqueous solution on the permeable sheet so that step-wise or unit-wise operation may be achieved.

Upon application of the vacuum to the second surface 12B of the permeable sheet, a substantial portion of the aqueous solution containing amphiphilic proteins is drawn from the first surface 12A and substantially through the permeable sheet. This passage of the aqueous solution through the permeable sheet is generally thought to generate the shear stress conditions necessary to provide appropriate levels of adsorption of a portion of the amphiphilic proteins onto the individual exposed surfaces of the permeable sheet.

Generally speaking, evacuation of the aqueous solution of amphiphilic proteins under vacuum levels described above to achieve suitable shear stress conditions may be accomplished with a sheet having a permeability of at least about 20 $cfm/ft^2$, as measured for a substantially dry sheet prior to being processed. For example, the permeability of the sheet may range from about 50 to over 200 $cfm/ft^2$, as measured for a substantially dry sheet prior to being processed. If a sheet has inadequate permeability, the aqueous solution may puddle or pool on the first surface and may be non-uniformly concentrated, absorbed or diffused through the sheet. In such cases, it is generally thought that satisfactory conditions could be achieved by applying higher levels of vacuum, higher pressures and/or levels of force to the aqueous solution of amphiphilic proteins contacting the permeable sheet and/or an applied gas pressure to drive the aqueous solution through the sheet thereby generating the appropriate sheer stress conditions.

According to the present invention, it is desirable to wash or rinse the permeable sheet 12 after being contacted with the aqueous solution of amphiphilic proteins. Washing or rinsing (not shown) the coated permeable sheet should be carried out using an aqueous liquid having a relatively high surface tension (e.g., water). Although the volume of the liquid wash or rinse may vary greatly, it has been found that a volume of liquid rinse generally similar to the volume of aqueous solution of amphiphilic proteins may be satisfactory (e.g., from about 0.5 to about 1.5 times the volume of protein solution).

The permeable sheet 12 may then be passed to a drying operation (not shown). Exemplary drying operations include processes which incorporate infra-red radiation, yankee dryers, steam cans, microwaves, hot-air and/or through-air drying techniques, and ultrasonic energy.

According to the invention, the aqueous solution of amphiphilic proteins should be able to flow freely. For example, the aqueous solution of amphiphilic proteins may have a viscosity of from about 0.1 to about 5 centipoise. Generally speaking, lower viscosity solutions appear to be desirable. It is contemplated that low viscosity liquids are prone to flow conditions that may be associated with the shear stress conditions required to produce a satisfactory coating of amphiphilic proteins on the permeable sheet. However, it is contemplated that more viscous aqueous solutions could be used in the practice of the present invention. Although the inventors should not be held to a particular theory of operation, it is thought that the ability of the aqueous solution of amphiphilic proteins to flow freely (and in relatively large volumes) through the sheet with (or without) the assistance of an applied vacuum enhances the desired formation of shear stress conditions needed for desired levels of adsorption of amphiphilic proteins onto the permeable sheet.

According to one embodiment of the invention, a substantial portion of the aqueous solution of amphiphilic proteins may be drawn through the sheet in less than about 1 or 2 seconds to generate the appropriate shear stress conditions for adsorption. For example, a substantial portion of the aqueous solution may be drawn through the permeable sheet in less than about 0.1 second. As a further example, a substantial portion of the aqueous solution may be drawn through the permeable sheet in less than about 0.01 second. As yet another example, a substantial portion of the aqueous solution may be drawn through the permeable sheet in less than about 0.001 second. It is thought that appropriate shear stress conditions for adsorption may be encountered when the flow of aqueous solution has a Reynold's number of at least about 200. For example, the flow of aqueous solution may have a Reynold's number of at least about 400.

Generally speaking, the amphiphilic proteins may be selected from classes of globular proteins and/or random coil proteins. For example, the amphiphilic proteins may be milk proteins. Desirably, the amphiphilic proteins may include proteins such as those found in bovine milk including, for example, various caseins and whey proteins.

According to the present invention, milk proteins (e.g., bovine milk proteins) have been identified as well-suited to provide a durable and chemically reactive surface modification when applied to a permeable substrate as describe above. Generally speaking, milk is an aqueous dispersion including lactose and some mineral salts in true solution, serum proteins in macromolecular solution, casein-calcium-phosphate micelles, and fat globules in colloidal suspension. The proteins in milk can be described as generally amphiphilic (i.e., they have both hydrophilic and hydrophobic regions) and tend to be surface active. Beta-casein (β-casein), one of the major milk proteins, is so surface active that it is used as an emulsifier in various food products. The amino acid sequence and solution structure of casein are known. Tables 1 and 2 provide an example of the major protein and non-protein components in bovine milk (i.e., cow's milk). The specific composition may vary according to species and genotype.

Because these proteins are amphiphilic, they have hydrophobic regions that, in the practice of the present invention, can be readily adsorbed to a polyolefin surface and hydrophilic regions which will orient toward aqueous solution. A wide variety of applications exists for this type of modified surface. For example, the hydrophilic portions of the proteins will impart wettability to relatively hydrophobic substrates' (e.g., polyolefin or more particularly, polypropylene substrates) and may serve as a surface primer for attaching other biologically relevant macromolecules such as chitosan and hyaluronic acid.

Figure 2B:
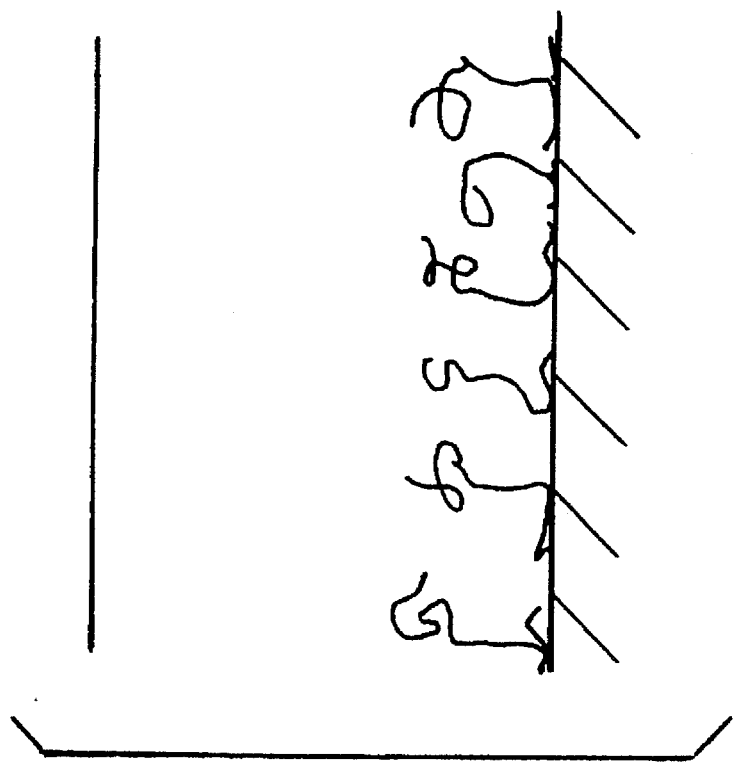
FIGS. 2A and 2B are illustrations of an exemplary mechanism for protein adsorption.
Figure 2A:
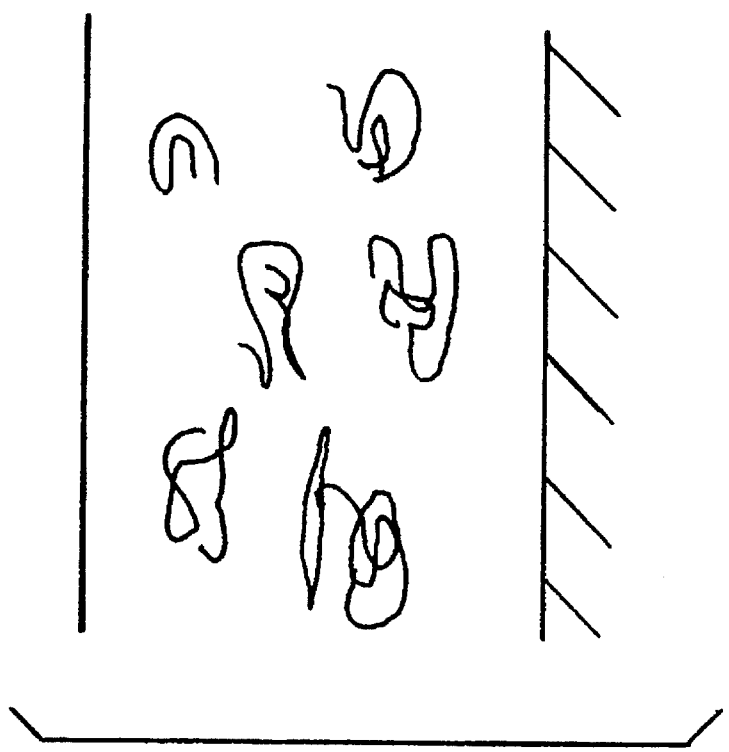

Although the inventors should not be held to a particular theory of operation, it is thought that certain interfacial free energy phenomena and the application of shear stress to proteins in aqueous solution tend to drive the protein coating (i.e., protein adsorption) on the permeable sheet. Referring to FIG. 2A, there is shown an illustration of a simplified structure of an amphiphilic protein such as, for example, β-casein dissolved in aqueous solution. Micelles which are known to coexist in solution when the concentration of protein is above the critical micelle concentration are not shown for clarification. β-casein is a random coil protein, and as such, adapts a disordered conformation which minimizes contact of the hydrophobic amino acids of the protein with water. The overall free energy of the solution is minimized when these hydrophobic areas of the protein self-associate to screen themselves from the aqueous environment. When exposed to a permeable sheet having individual exposed surfaces (some of which having relatively low surface energies) such as, for example, a polyolefin nonwoven, as depicted in FIG. 2B, the hydrophobic amino acid groups will have a tendency to associate with the hydrophobic fiber surface, leaving hydrophilic groups oriented toward the aqueous solution and thereby lowering the interfacial energy. These hydrophilic amino acids are thought to be responsible for the improved water wettability of the protein modified polyolefin. Although the inventors should not be held to a particular theory of operation, this orientation of the protein at the surface is thought to be the energetically favored state, and explains the tenacious character of the protein coatings on the surface (i.e., fiber or film surface).

The application of shear stress to proteins in aqueous solution, as depicted in FIG. 3, distorts their thermodynamically favored equilibrium conformation, exposing normally shielded hydrophobic groups to the aqueous solution. This produces an energetically unfavored interface. When in close proximity to a nonwoven fiber surface, these hydrophobic groups are attracted to the hydrophobic polyolefin substrate, and intermolecular hydrophobic attractions predominate. Adsorption is promoted by a decrease in interfacial free energy. The increase in the number of hydrophobic groups exposed under conditions of increasing shear (i.e. more structural distortion) results in an increased tendency for protein deposition.

EXAMPLES

AQUEOUS AMPHIPHILIC PROTEIN SOLUTIONS

Several different aqueous solutions of an amphiphilic protein were prepared for an exemplary method of coating a permeable sheet with amphiphilic proteins. The solution compositions are as follows:

Whole Milk: Sealtest® Homogenized Vitamin D milk (whole milk) containing approximately 3.8% fat content. Milk was used as obtained.

Nonfat Milk: Carnation® Natural Nonfat Dry Milk (Nestle Food Company) as obtained from local grocery stores was added to hot water (approximately 55°–80° C.) to form various weight percent (0.01, 0.1, 1, 2.5, 8.0) solutions. Water was heated simply to aid in dissolution of the nonfat dry milk. Care was taken to keep the water temperature below 80° C. to avoid reprecipitating the milk solution. Milk solutions were stirred until all solids were dissolved and then stored in a refrigerator until use. Solutions were warmed to room temperature prior to exposure to nonwoven materials. 2.5 percent, by weight, nonfat milk solutions were used as the standard solution for surface modification. Other solutions were used in the study of the concentration dependence of the milk protein deposition.

Surfactant Addition: Various surfactants were added to nonfat milk solutions prior to the solution's exposure to a permeable substrate (i.e., nonwoven web of meltblown polypropylene fibers) as described below. Surfactants were added in sufficient amounts to promote wetting of polypropylene meltblown. The surfactants and their concentration in solution was were follows:

(A) 1 percent, by weight, siloxane polyether 5830 (Goldschmidt Chemical Company, Hopewell, Va.) was added to 1 percent, by weight, nonfat milk solution and stirred for approximately 2 hours to allow for dissolution of the surfactant.

(B) 2 percent, by weight, sodium dodecyl sulfate (containing some $C_{14}$–$C_{16}$ sulfate) was added to 2.5 percent, by weight, nonfat milk solution and stirred for approximately 15 minutes. 2 percent, by weight, of the surfactant was necessary to impart wetting of the meltblown by the solution.

(C) 0.5 percent, by weight, hexanol was added to 2.5 percent, by weight, nonfat milk solution and stirred to ensure dissolution.

(D) Triton X-102 (Union Carbide Corporation, Danbury, Conn.) was added to 0.5, 1.0, and 2.5 percent, by weight, nonfat milk solutions in amounts of 0.025 and 0.25 percent, by weight, (250 and 2500 parts per million (ppm), respectively). 250 ppm Triton X-102 in 2.5 percent, by weight, nonfat milk solution was sufficient to promote wetting of the polypropylene meltblown.

SOLUTION CONTACT WITH A PERMEABLE SUBSTRATE (PROTEIN DEPOSITION)

Vacuum Extraction: The standard procedure used for preparation of protein-coated permeable substrates is described below, and unless otherwise noted, all procedures used (i) the aqueous amphiphilic protein solutions described above; and (ii) a nonwoven web of meltblown polypropylene fibers having a basis weight of about 0.5 ounces per square yard (osy) (about 17 gsm) available from Kimberly-Clark Corporation. A disk of the polypropylene meltblown web having a diameter of about 49 mm was placed in a Buchner funnel over a vacuum flask. Approximately 100 mL (milliliters) of the 2.5 percent, by weight, nonfat milk solution at room temperature was introduced into the funnel and passed through the disk of polypropylene meltblown web with the aid of an applied vacuum. In general, the nonfat milk solution wet the polypropylene web for a total exposure time of less than 1 second. The polypropylene web was rinsed with 100 mL of distilled water in the same vacuum extractor apparatus and dried at ambient conditions. Dry add-ons (i.e., the weight of the protein coating) for these small samples were negligible and therefore not recorded.

This procedure was modified for use with a disk of polypropylene meltblown web (1.5 osy) having a diameter of about 18.5 cm by using a large Buchner funnel, a 500 mL portion of the 2.5 percent, by weight, nonfat milk solution, and a 500 mL distilled water rinse. Representative add-ons for these large samples averaged approximately 0.38%. Confirmation of protein coating was made via X-ray photoelectron spectroscopy and fluorescence optical microscopy analyses.

Shear Dependence: Samples of the above-described nonwoven web of meltblown polypropylene fibers were exposed to nonfat milk solution (and a nonfat milk solution foam) for varying times. Absolute shear rates were not calculated. The amount of X-ray photoelectron spectroscopy detectable nitrogen on each sample was measured and compared. The different modes of exposure were as described below:

(A) A 25-mm-diameter disk of polypropylene meltblown nonwoven fabric (PP MB), 0.5 osy, was allowed to quiescently soak for 5 minutes in 20 mL of 8 percent, by weight, nonfat milk solution. The sample was rinsed by soaking in distilled water for approximately 30 seconds and allowed to dry ambiently.

(B) 10 mL of 1 percent, by weight, nonfat milk solution was passed via hand-held syringe through a 25-mm-diameter PP MB disk, 0.5 osy, housed in a 25-mm-diameter syringe disk filter apparatus. The exposure time was varied, and in one case was 1 minute, the other 1 second. Both sets of samples were rinsed with 40 mL distilled water and allowed to dry ambiently.

(C) 50 mL of 2.5 percent, by weight, nonfat milk solution was passed via vacuum extraction (as described above) through a 49-mm-diameter PP MB disk, 0.5 osy, held in a Buchner funnel apparatus. Exposure time was <1 second. Samples were rinsed with 100 mL distilled water via vacuum extraction and allowed to dry ambiently.

(D) Foam generated by the vacuum extraction of the nonfat milk solution through PP MB was placed on an untreated PP MB disk, 0.5 osy, and vacuum extracted a second time. The filter disk was then rinsed with 100 mL of distilled water and allowed to dry ambiently.

SAMPLE CHARACTERIZATION

Coating Identity/Homogeneity

X-ray Photoelectron Spectroscopy: X-ray Photoelectron Spectroscopy (XPS) data were collected using a Surface Science Labs M-Probe ESCA with monochromatic aluminum K$\alpha$ radiation. All samples were mounted on double-side adhesive tape and charge neutralized with a 0.5 eV electron flood. Binding energies were referenced to C(1s) for hydrocarbon at 284.6 eV for charge compensation. XPS-detectable nitrogen was monitored to determine the nature of the coating and also to monitor the dependence of protein deposition on concentration, shear, and solvent washes.

Scanning Electron Microscopy: Field emission scanning electron microscopy analyses were carried out using a Hitachi S4500 field emission scanning electron microscope.

Staining/Optical Microscopy: For polarized light microscopy, samples were stained with ninhydrin spray reagent (0.2% ninhydrin in ethanol, Sigma Chemical Company) and dried at 55° C. until a purple color developed. Samples were also stained with Alizarin Red S (Aldrich Chemical Company, Inc.) by soaking treated samples in approximately 25 mL of 200 ppm alizarin in aqueous solution until a red color developed; samples were rinsed with water and ambiently dried. Samples were then observed with transmitted polarized light using a Zeiss polarized light microscope.

For fluorescence optical microscopy, samples were treated with protein-specific fluorescamine spray reagent (0.05% fluorescamine in acetone, Sigma Chemical Company) and immediately treated with 25 percent, by weight, ammonia (spray) to increase fluorescence intensity. After drying ambiently, the samples were observed using a Leitz Fluovert inverted microscope with excitation by long wavelength UV light (355–425 nm).

Polyacrylamide Gel Electrophoresis (PAGE): Analysis of the protein coating on the nonwoven web of meltblown polypropylene fibers was carried out using conventional SDS (sodium dodecyl sulfate) polyacrylamide gel electrophoresis equipment and techniques. The milk-protein coating on the meltblown polypropylene web was eluted completely (confirmation by XPS) from the web by boiling a treated sample in 1 percent, by weight, sodium dodecyl sulfate solution for 10 minutes. Samples were then rinsed with distilled water and the rinse solution added to the eluent. This final solution was concentrated 40× using an Amicon cell equipped with a 10,000 MW cutoff membrane to maintain the surfactant concentration at 1 percent, by weight. The molecular weights of the proteins in solution were determined by SDS-PAGE using a 20% acrylamide gel, essentially as described by Weber, K; Pringle, J. R.; Osborn, M.; Methods Enzymol., 26, 2, (1972).

Amino Acid Sequencing: Amino acid sequencing of the most dominant bands in the PAGE gels was carried out utilizing standard amino acid sequencing techniques.

Coating Durability

The durability of the protein coatings was tested by exposing coated samples of the meltblown polypropylene web to various liquids/solutions and conditions designed to attack the coatings.

Solutions described below were passed through individual milk-protein treated meltblown polypropylene webs having a diameter of about 25 mm. Individual samples were held in a syringe disk filter and rinsed with one of the following:

20 mL distilled water, 10 mL 5 percent, by weight, acetic acid, 10 mL 0.5M HCl, 10 mL 300 ppm Triton X-102.

Samples were then rinsed with distilled water and dried at ambient conditions.

In addition, individual milk-protein treated meltblown polypropylene web samples having a diameter of about 25 mm were treated by 10 minutes of sonication in ethanol or boiling in 10 mL 1 percent, by weight, sodium dodecyl sulfate. Samples were then rinsed with distilled water and dried at ambient conditions.

XPS was used to determine the presence of protein on the surface of the meltblown polypropylene web samples.

Wettability and Surface Energy

Contact Angle Measurements: Contact angles of sessile drops of whole and nonfat milk solutions on a polypropylene film were determined using a Rame-Hart, Inc. goniometer (model number 100-00 115) equipped with a videocamera.

Fluid Surface Tension Reduction: Meltblown polypropylene webs having a basis weight of 1.5 osy (51 gsm) available from Kimberly-Clark Corporation were milk-protein treated. Samples measuring approximately 2"×3" were soaked for 24 hours in 80 mL of deionized water. The surface tension of the water was measured before and after sample soaking via the DuNouy ring method to determine if wetting of the material occurred via fluid surface tension reduction or by some other mechanism.

Critical Surface Tension of Wetting Measurements: Approximations of the critical surface tension of wetting of the milk-protein-treated materials were made by testing water wettability and by using wetting tension fluids available from Pillar Technologies, Inc. of Hartland, Wis. Sessile drops of the wetting fluids were placed on milk-protein-modified meltblown polypropylene webs in order of decreasing surface tension. The surface tension of the first drop to spread on the surface of the treated web within 2 seconds yielded an approximation of the treated web's critical surface tension of wetting in dynes/cm (which may be correlated to an approximation of surface energy). See, Bennet, M. K. and Zisman, W. A.; *Relation of Wettability by Aqueous Solutions to the Surface Constitution of Low Energy Solids*; J. Phys. Chem., pps. 1241–1246, Volume 63 (1959).

EXPERIMENTAL RESULTS

COATING IDENTITY

The nature of the coating deposited from nonfat milk solution was determined using XPS, optical and fluorescence microscopy, SDS-PAGE analysis, and amino acid sequencing. X-ray photoelectron spectroscopy(XPS) is a well known surface analysis method sensitive to the outermost 10 nanometers of surface. XPS can detect all elements other than hydrogen, and can be used for semi-quantitative elemental and chemical surface analysis.

Figure 4:
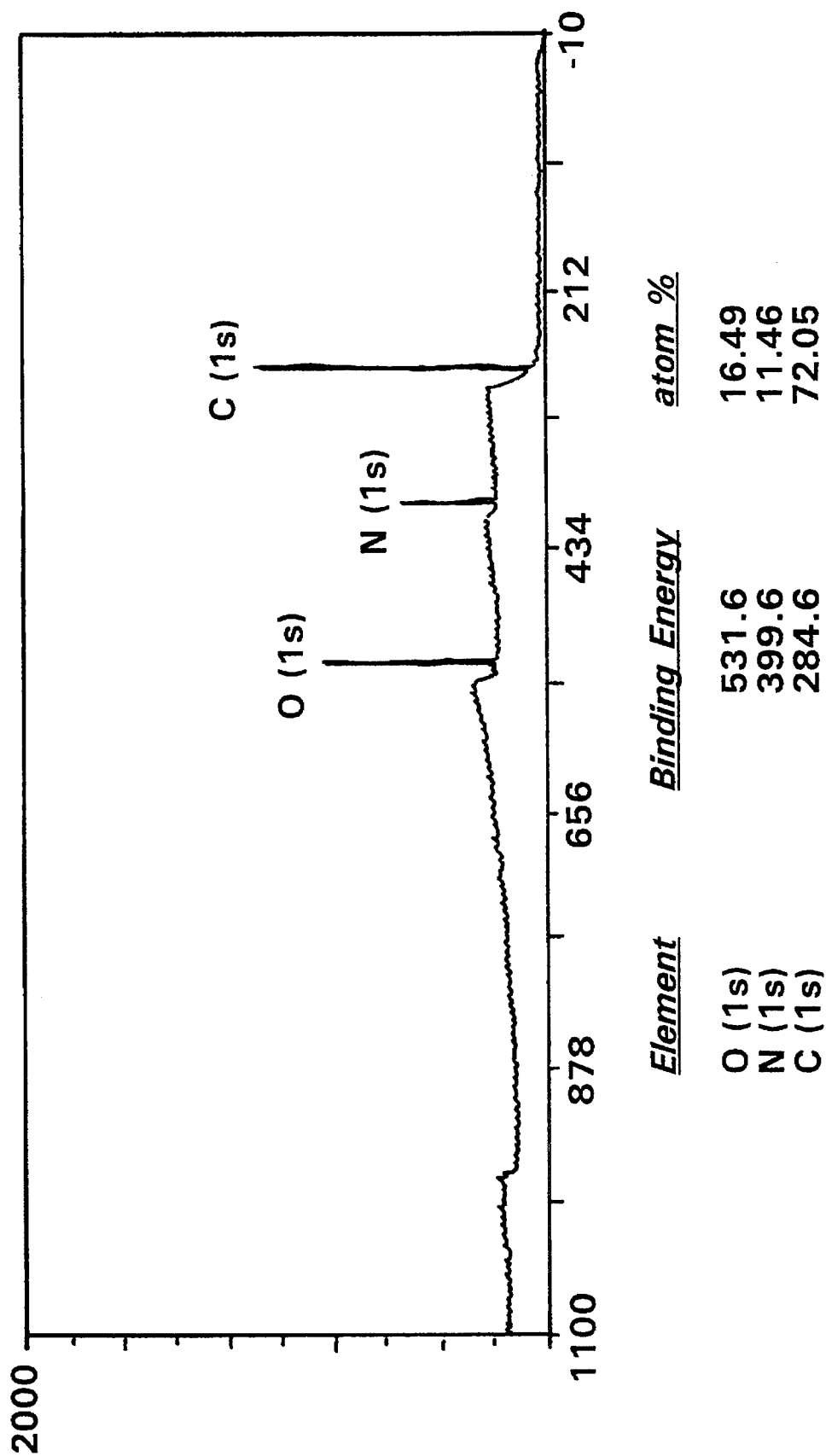
FIG. 4 is an X-Ray Photoelectron Spectroscopy (XPS) spectrum of an exemplary protein-coated permeable sheet.
Figure 5A:
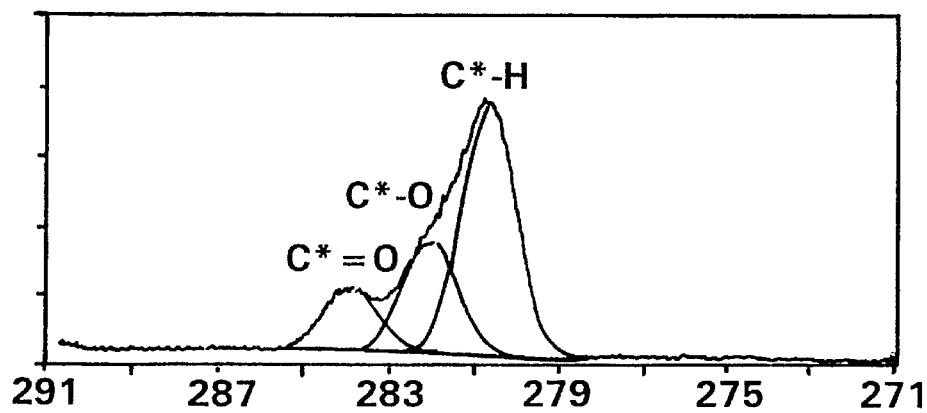
FIGS. 5A, 5B and 5C are XPS high resolution spectra of an exemplary protein-coated permeable sheet.
Figure 5B:
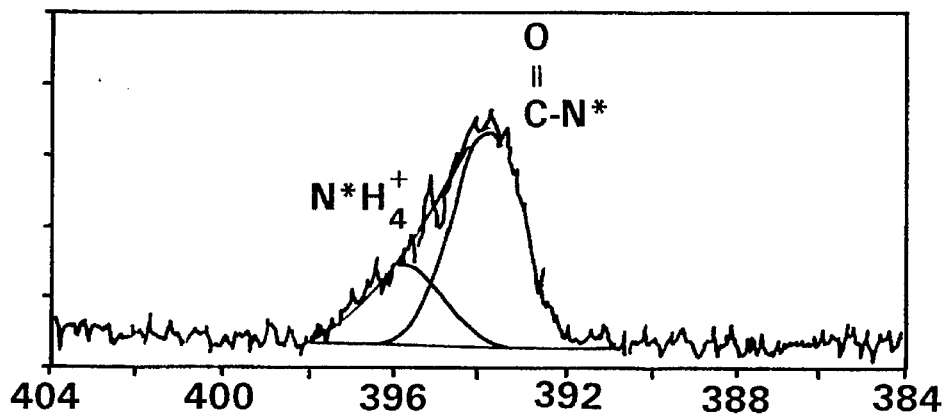
Figure 5C:
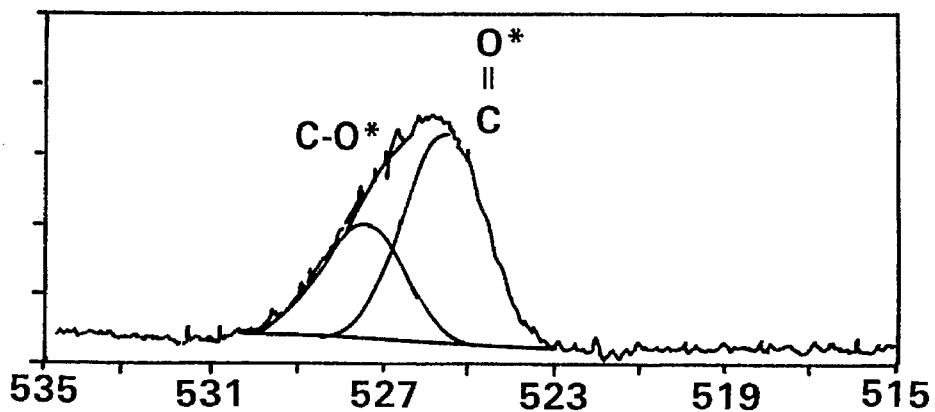

FIGS. 4 and 5 summarize the XPS data, including high resolution spectra obtained for each of the elements identified. The XPS survey spectrum depicted in FIG. 4 reveals the presence of oxygen, nitrogen, and carbon on the surface of the milk protein treated polypropylene meltblown nonwoven web. A control untreated surface would produce only carbon in the XPS spectrum. The relative amounts of oxygen and nitrogen are consistent with a surface which is predominantly proteinaceous in nature; a continuous coating of milk proteins at least 10 nanometers thick is suggested. For comparison, XPS of milk solids alone results in 65.5% carbon, 23.8% oxygen and 10.6% nitrogen.

XPS is useful to determine the presence of functional coatings on otherwise inert, hydrocarbon surfaces such as polyolefins. The high resolution carbon (1s) spectrum, FIG. 5A with corrected binding energies of 284.6 eV (hydrocarbon), 286.0 eV (ether) and 287.9 eV (carbonyl) is consistent with the polyamide functionality of a protein coating. Untreated polypropylene would produce only a hydrocarbon singlet in the carbon spectrum. The nitrogen (is) high resolution spectrum, FIG. 5B, with corrected binding energies of 399.6 eV (amide) and 401.6 eV (ammonium) is also consistent with a polypeptide containing some basic amino acid residues. The oxygen (is) high resolution spectrum, FIG. 5C, has corrected binding energies of 531.5 eV (carbonyl) and 533.4 eV (alcohol). The presence of the lower binding energy carbonyl is consistent with the amide functionality present in protein peptide bonds. No nitrogen or oxygen is detected on an untreated polypropylene surface.

Optical and fluorescence microscopies were conducted using the stains ninhydrin and fluorescamine, respectively. A purple color and blue fluorescence are observed on respective samples treated with these stains, which further corroborates the proteinaceous nature of the surface modification.

Figure 6:
FIG. 6 is a micrograph of an exemplary protein-coated permeable sheet.

To further corroborate the conclusions obtained from XPS, the milk protein treated sample was examined by field emission secondary electron microscopy (FESEM). This technique is well-suited for determining the morphology of the protein coating on individual nonwoven fibers. Unlike conventional SEM, FESEM does not require a conductive, vapor deposited gold coating to eliminate sample charging. FESEM uses low analysis voltages, and the sample can be examined "as is", with no preparation other than simple mounting. Referring to FIG. 6 which is a 1000× (linear magnification) FESEM micrograph of a milk-protein treated 0.5 osy meltblown polypropylene nonwoven, a thin protein coating can be readily seen to be on the fibers and not collected at fiber interstices. No physically entrapped protein is detected. Darker regions are areas of lower protein deposition and not regions of unmodified polypropylene. It can be concluded from FESEM that there is some variation in the thickness of the protein coating. FIG. 6 is thought to be generally illustrative of the type of protein coatings that can be deposited by the methods taught by this invention.

Electrophoresis is commonly used to help identify particular classes of protein and to determine approximate molecular weights. Protein standards are separated in a gel which is also used to analyze solutions of unknown proteins. Comparing the position and shape of the electrophoresis bands for the unknown protein to protein standards helps identify the unknown. SDS-PAGE was used to help identify the types of protein adsorbing from milk solutions onto the polypropylene nonwoven.

SDS-PAGE of the coating after elution from the filter surface yields a number of broad bands; a photo of the gel is shown in FIGS. 7A, 7B, 7C and 7D.

Figures 7A, 7B, 7C, 7D:
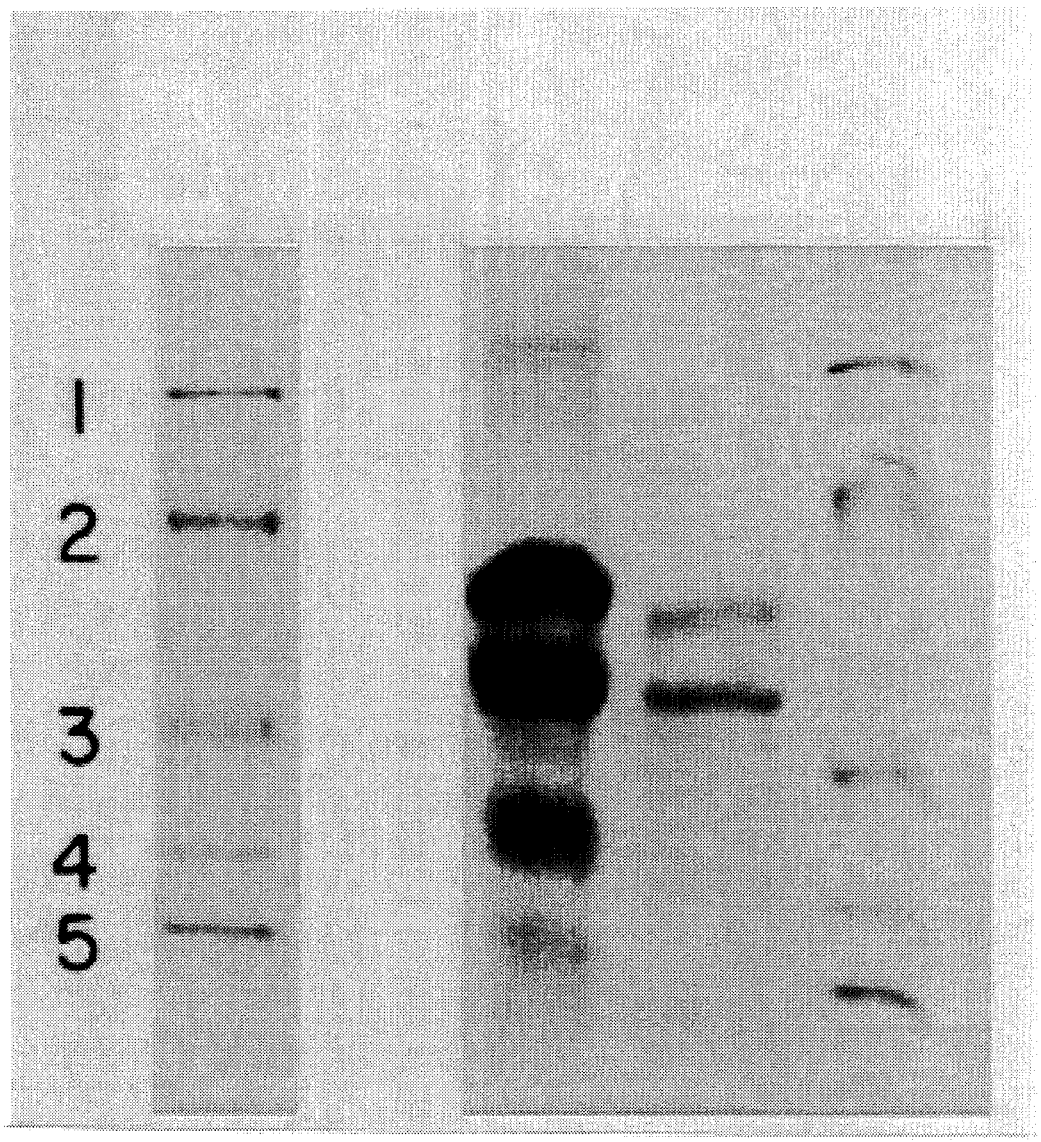
FIGS. 7A, 7B, 7C and 7D are representations of SDS-Polyacrylamide Gel Electrophoresis results for an exemplary protein-coated permeable sheet.

Protein standards were developed in the outer lanes of the gel as shown in FIGS. 7A and 7D. Molecular weights of the protein standards as marked are 1) BSA—66,700; 2) ovalbumin—45,000; 3) trypsinogen—24,000; 4) β-lactoglobulin—18,400; 5) lysozyme—14,300. A solution extract of protein coating removed from the milk treated polyolefin by boiling in an aqueous solution of sodium dodecyl sulfate (1 percent, by weight) was analyzed in the same gel by SDS-PAGE with results shown in FIG. 7B. A dilute solution of the milk powder as obtained (Nestle Food Company) was also analyzed for comparison, FIG. 7C. A number of proteins are present in both samples. N-terminal amino acid sequences of the darkest bands in 7B match that of bovine βcasein, indicating that this is the predominant protein coating the nonwoven. Proteins other than β-casein are also deposited. The data indicating that a number of proteins are adsorbed to the polypropylene meltblown with the major constituent being beta-casein is consistent with the reported composition of milk (See Tables 1 and 2).

This lack of specific protein adsorption from nonfat milk may also indicate the possibility of depositing of a variety of specific proteins and/or enzymes on the polypropylene surface.

COATING DEPOSITION

Uniformity of Deposition

The uniformity of the protein coating over the surface of a milk protein treated polypropylene meltblown nonwoven web (exposed to protein in a non-homogenous shear field using the Buchner funnel procedure described above) was assessed by measuring XPS nitrogen intensity systematically at various spots on the nonwoven web surface. The results tabulated in Table 3 show the excellent spot-to-spot agreement, indicating a uniform protein coating over the nonwoven web surface. FESEM micrographs (FIG. 6) corroborate this data, indicating a thin, tenacious coating which is relatively uniform along individual fibers and is not aggregated at fiber intersections. Apparent heterogeneity in the coating thickness in the FESEM micrograph is believed to result from differences in protein thickness and not from the presence of unmodified polypropylene.

Figure 8:
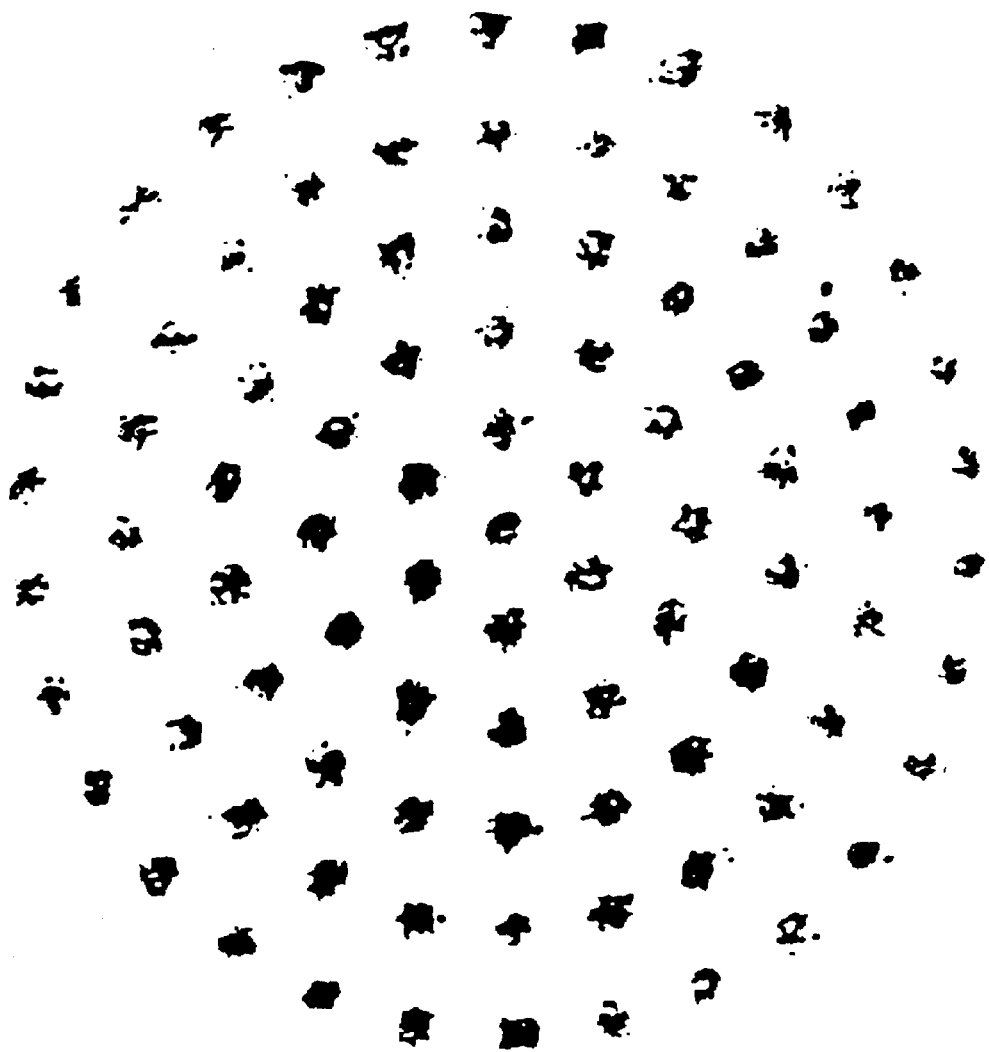
FIG. 8 is a representation of a stained, vacuum extracted, exemplary protein-coated permeable sheet.

However, when these coatings are stained (ninhydrin and Alizarin Red S) in bulk and observed macroscopically, a polka dot pattern is evident over the surface of the filter, as shown in FIG. 8. The polka dot pattern shown after staining corresponds to the holes in the Buchner funnel used in the vacuum deposition of the milk proteins. The holes in the funnel produce areas of high shear stress.

Systematic XPS investigations of selected areas on and off the polka dots on Alizarin Red S-stained samples corroborate the homogeneity in XPS-detectable nitrogen observed on the unstained sample (see above). Optical microscopy investigations of the polka dot regions indicate coatings aligned along fibers, demonstrating that these are regions of greater deposition and not simply particle entrapment (i.e., no entrapped particulate matter was found in the polka dot regions). These patterns likely exist due to the shear dependence of protein adsorption.

Furthermore, there is a sidedness or gradient distribution to the deposition, especially on higher basis weight nonwoven webs. A gradient distribution of protein coating is defined as that condition when the collective concentration of protein on individual exposed surfaces (e.g., individual fiber surfaces) within one length element of the permeable sheet (e.g., nonwoven fabric) is different than the collective protein concentration on an equal number of individual exposed surfaces (e.g., individual fiber surfaces) contained in an adjacent, equally sized element. The gradient distribution may be expressed by the following equation:

$$d[P]/d[t] \neq 0$$

Where P is the total protein concentration and t is the length element over which the protein concentration is measured. The total protein concentration (P) can be measured in the two orthogonal directions parallel to the surface or in the thickness direction (i.e., X, Y or Z gradients) For a matrix of fibrous material, the dimensions of t are on the order of five fiber diameters. If the fibrous material is meltblown fibers, t is approximately 25 microns.

As an example, a 18.5 cm diameter disk of 1.5 osy polypropylene meltblown nonwoven web (thickness 35 microns) was contacted with 1200 mL of a 2.5 percent, by weight, milk protein solution followed by a rinse with 600 mL of distilled water.

Table 4 summarizes data showing a gradient distribution or sidedness as indicated by differences in XPS-detectable nitrogen and surface free energies (e.g., 11% and 60 dynes/cm (top) vs. 6% and 50 dynes/cm (bottom)). Untreated meltblown polypropylene nonwoven web has a surface energy of 30 dynes/cm. Analysis shows that the concentration of protein on the surface of the fibers is higher on the top side relative to the bottom. A top to bottom gradient is established. The apparent surface energy, determined by the maximum solution surface tension to wet the fabric, is higher on the top surface. This difference in apparent surface energy is manifest in a greater extent of water wettability for the top surface, and results from the higher surface concentration of protein.

Additionally, the top side and the bottom side of the treated meltblown polypropylene nonwoven web was stained with Alizarin Red S. The top side exhibited high optical density and the bottom side exhibited low optical density. Because only the protein coating reacts with the red stain, the darker color (i.e., high optical density) further corroborates the presence of more protein on the top surface of the nonwoven web.

Taken together, these results indicate that there is a relatively thin protein coating over all of the fibers in the sample, with isolated regions of greater deposition which result from the pattern in the vacuum extraction "box" under the nonwoven substrate and a gradient of deposition through the polyolefin web which is manifest as a sidedness. Because the protein coatings are amenable to staining by the water soluble dye Alizarin Red S and exhibit a patterned deposition, opportunities exist not only for improved dyeability of the polypropylene, but also for patterned applications of the coating utilizing patterned vacuum extraction. The use of a z-directional gradient in protein deposition to promote a coating gradient (sidedness) would find utility in the control of fluid flow through absorbent structures.

Concentration Dependence

Figure 9:
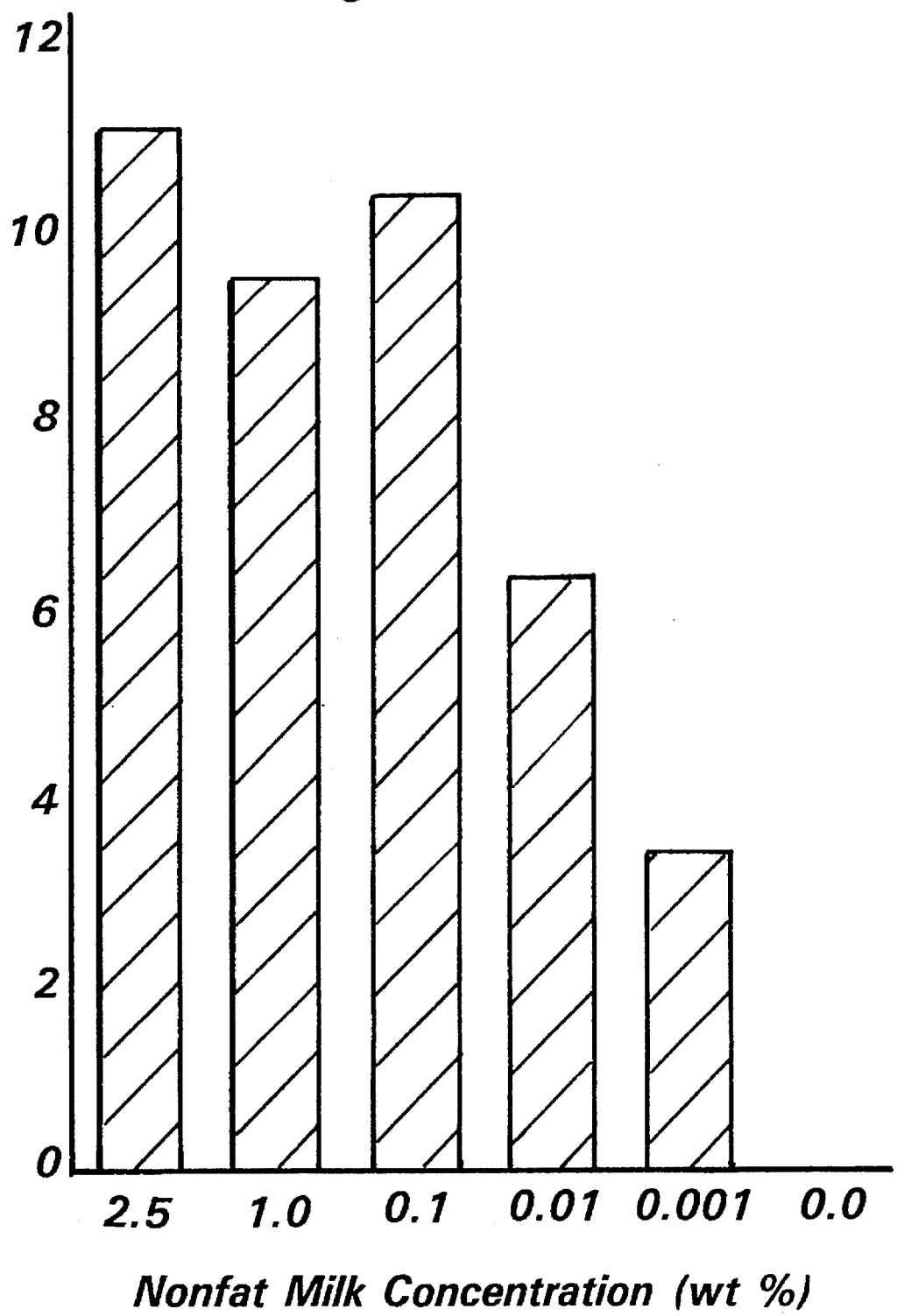
FIG. 9 is a representation of an exemplary relationship between protein solution concentration and protein deposition on a permeable sheet.

FIG. 9 illustrates the concentration dependence of protein deposition on meltblown polypropylene nonwoven webs under vacuum extraction conditions. To determine the effect of protein solution concentration on the amount of protein deposited, nonwovens were exposed to nonfat milk solutions ranging in concentration from 0.0 to 2.5 percent, by weight. Solution/nonwoven contact times were roughly two seconds. Samples were washed, dried and analyzed for nitrogen by XPS. Deposition imparted by nonfat milk solutions at concentrations as low as 0.1 percent, by weight, yield XPS-detectable nitrogen levels (10%) and nitrogen/carbon ratios (0.14) that are comparable to those of 2.5 percent, by weight, nonfat milk (11%, 0.15). At solution concentrations above 0.1 percent, by weight, films or protein coatings with a thickness of greater than about 10 nanometers are deposited. These results further indicate that solution concentrations as little as 10 parts per million (ppm) will deposit protein onto the nonwoven.

The addition of EDTA (ethylenediaminetetra-acetic acid) to nonfat milk solutions (to break up beta-casein micelles to yield more free protein) does not result in improved deposition under conditions of high shear at a given concentration of nonfat milk solids (data not shown).

Mechanism of Deposition

Whole milk solutions have been observed to exhibit less protein deposition than nonfat milk solutions of similar protein concentration. It is believed that protein deposition is facilitated by the high interfacial free energy between the polypropylene nonwoven and the solution of shear distorted protein. To further support this mechanism, deposition of protein solutions with different surface tensions was investigated. The amount of protein deposited from whole milk vs. dried milk, both of equal total protein concentration, was determined since the 3.9 percent, by weight, fat in whole milk is known to produce a solution with lower surface tension. Contact angle measurements were obtained by placing a sessile drop of the milk solution on polypropylene film.

XPS reveals a result consistent with the proposed mechanism. Much higher protein concentrations are deposited from nonfat milk. A decreased contact angle correlates with lower levels of protein deposition. The shear distorted protein in whole milk produces lower protein/water interfacial energy as a result of the surface active lipids present. The driving force to deposit whole milk proteins is thought to be lower in relation to solutions of dried milk solids that do not contain lipid.

Figure 10:
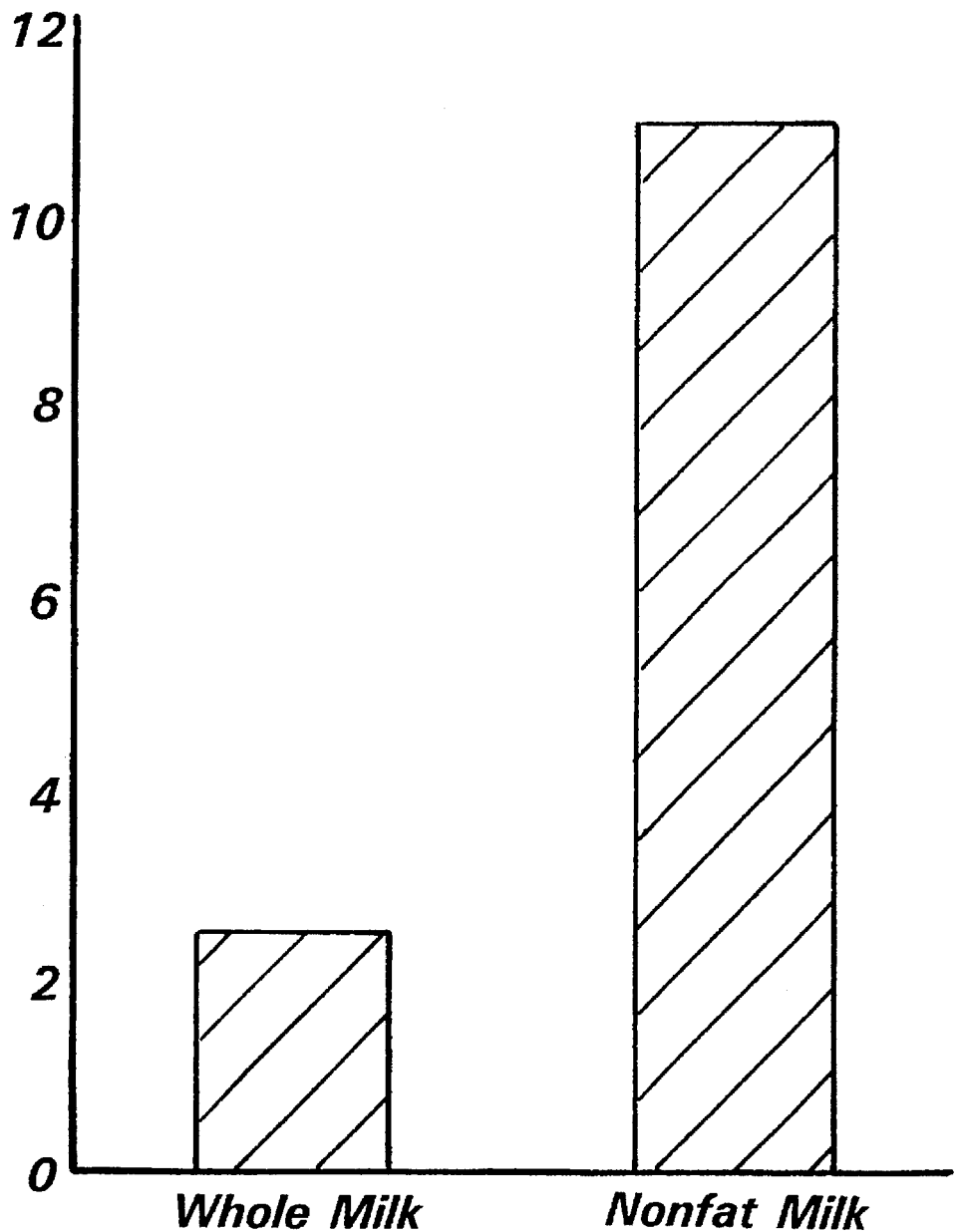
FIG. 10 is a representation of exemplary protein deposition from different protein solutions on a permeable sheet.
Figure 11:
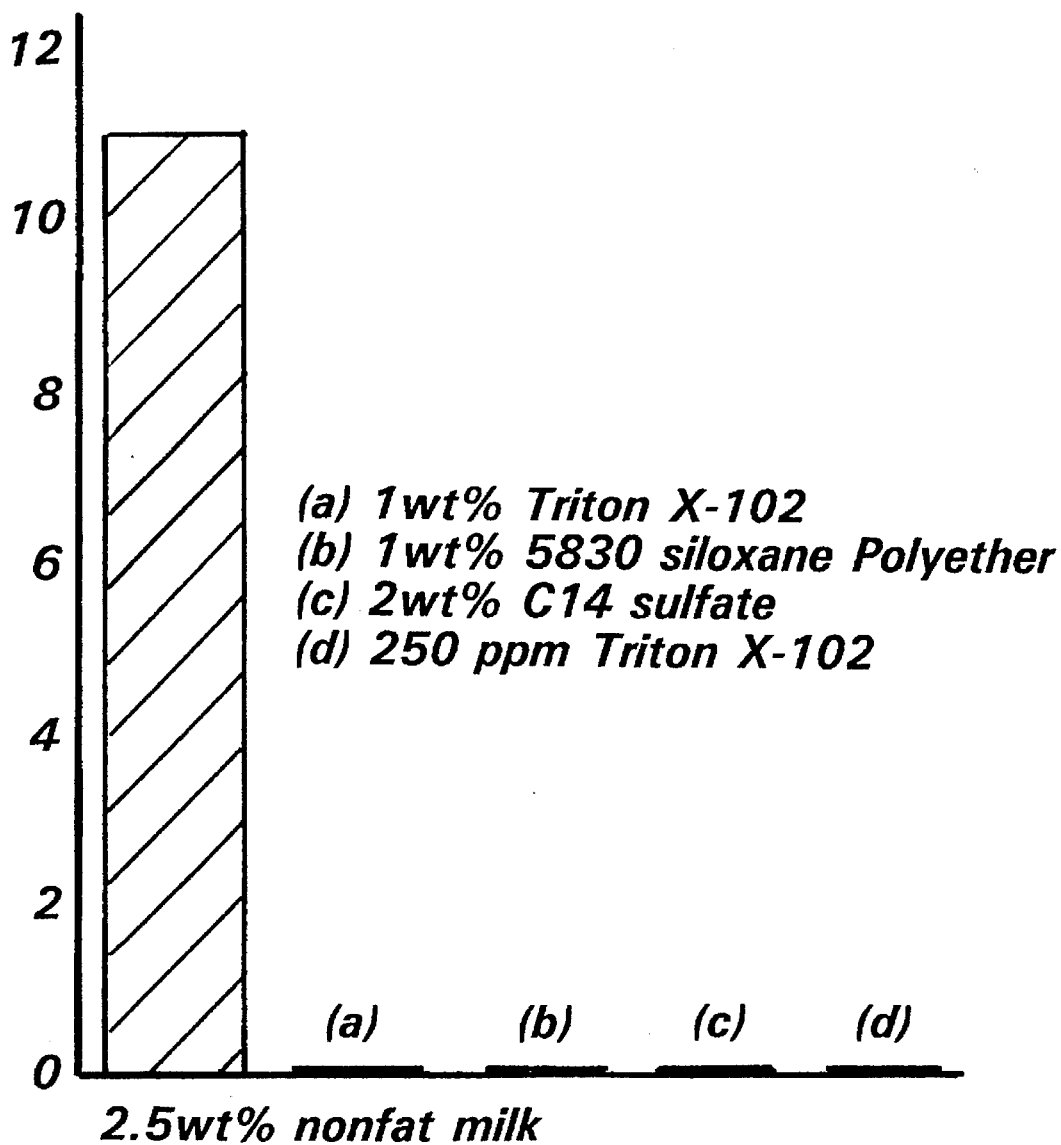
FIG. 11 is a representation of exemplary protein deposition from protein/surfactant solutions on a permeable sheet.
Figure 12:
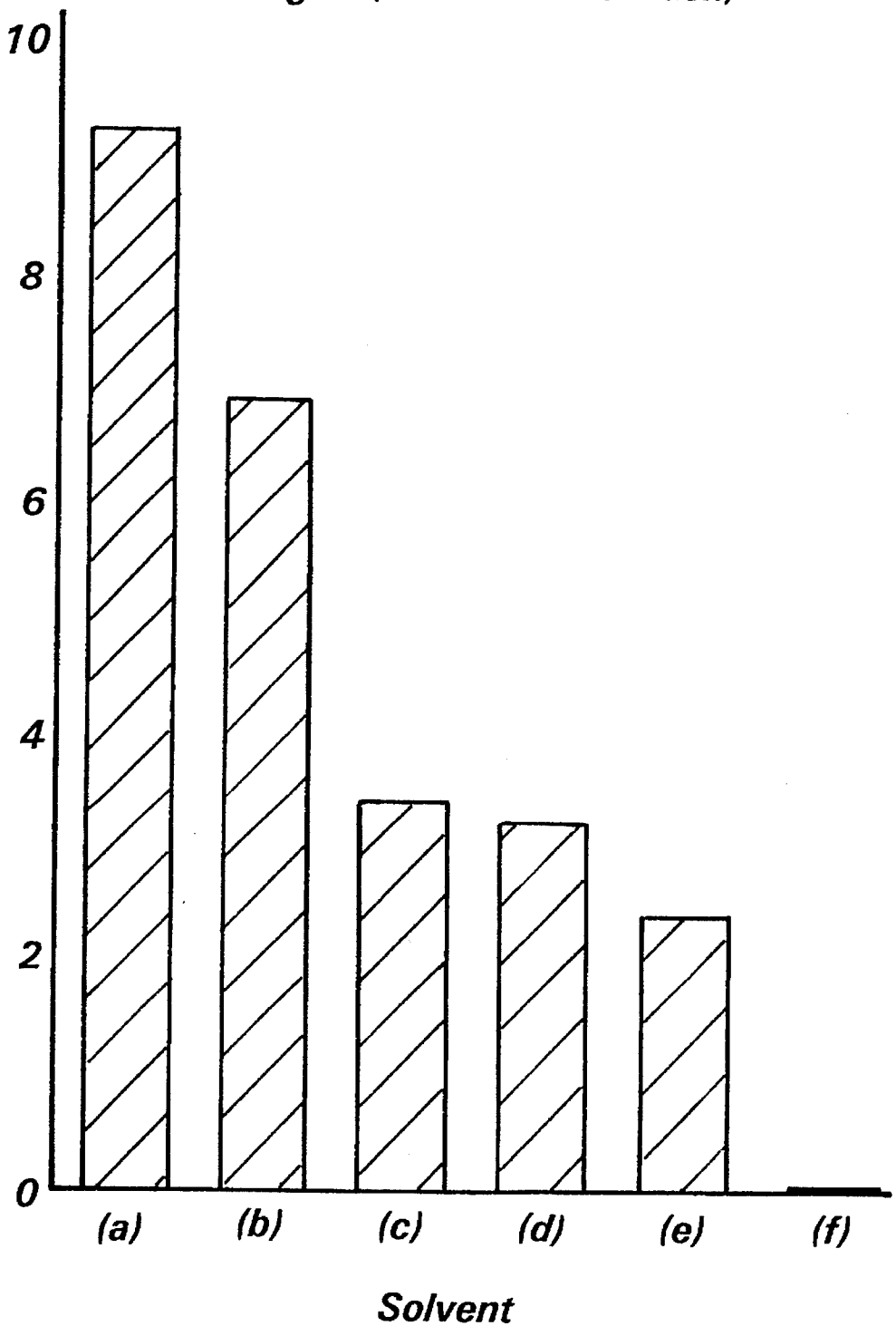
FIG. 12 is a representation of exemplary solvent durability of protein coatings on a permeable sheet.
Figure 13:
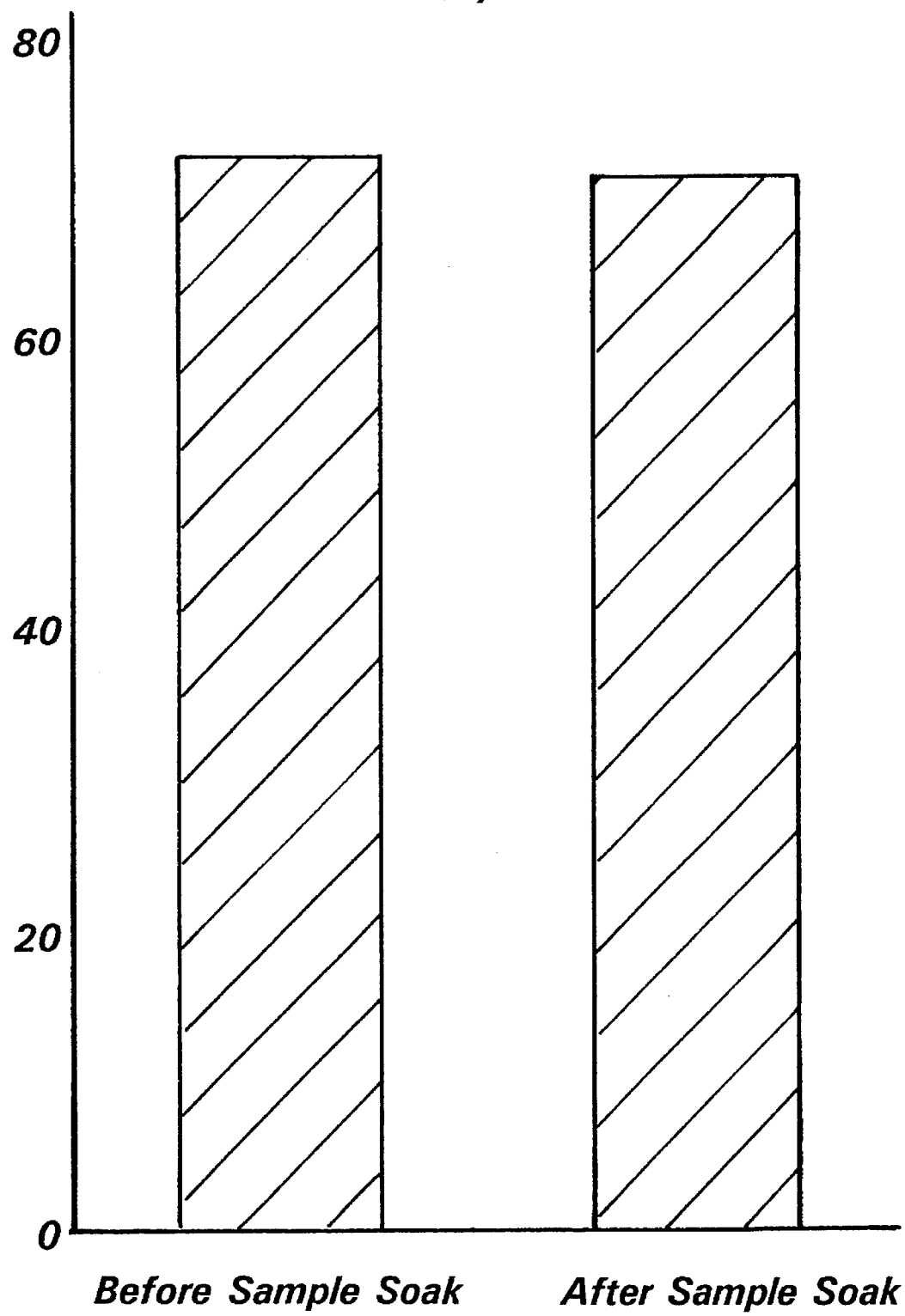
FIG. 13 is a representation of the effects of soaking an exemplary protein-coated permeable sheet on the fluid surface tension of the soaking solution.
Figure 14:
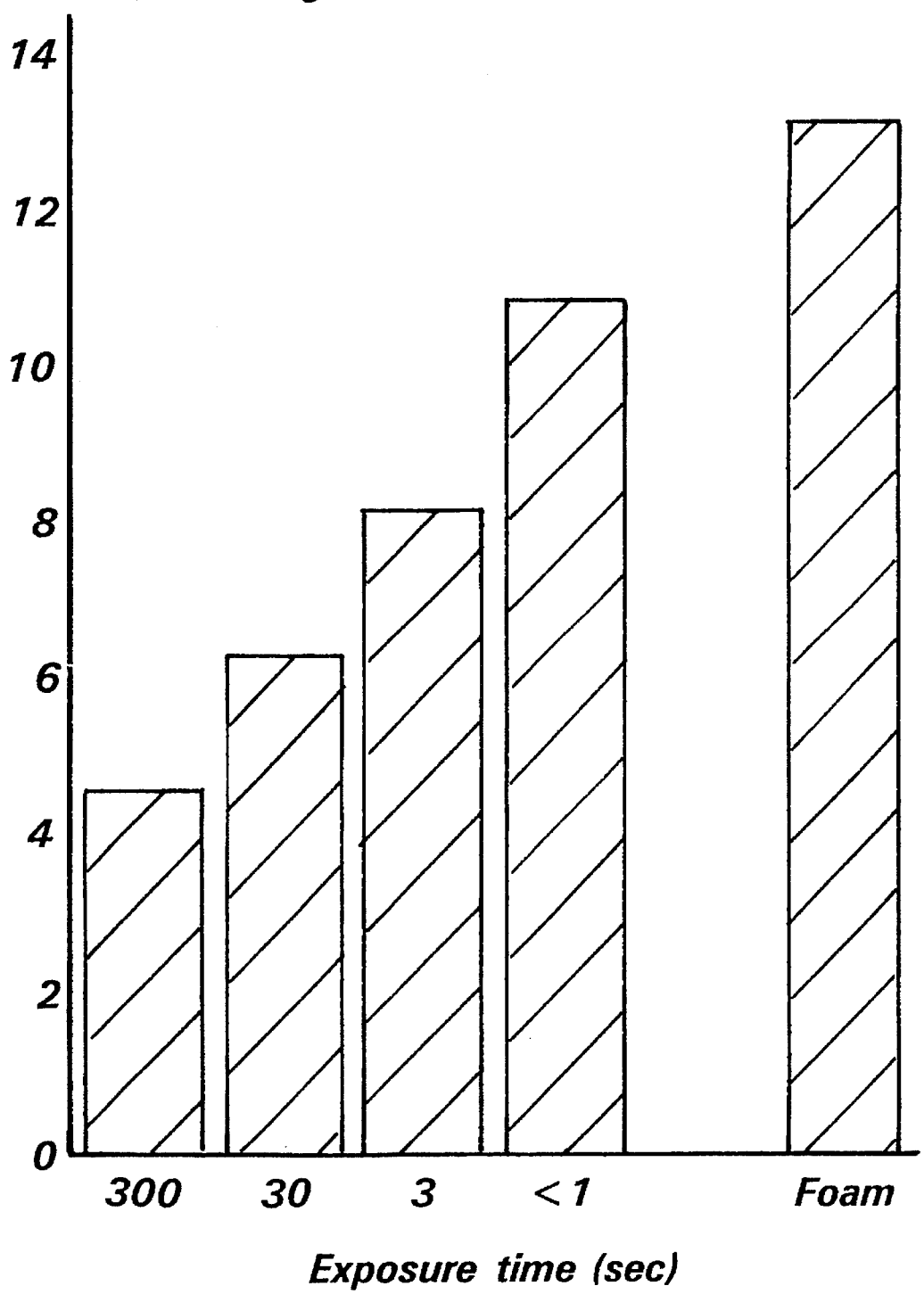
FIG. 14 is an illustration of an exemplary effect of shear forces on protein adsorption onto a permeable sheet.

As indicated in FIG. 10, a decrease in contact angle from 80° (nonfat milk solution) to 55° (whole milk) corresponds to a decrease in protein deposition, which renders whole milk ill-suited for use as a treatment solution.

To more analytically characterize the effects of surface active agents on the shear deposition of milk proteins, various surfactants were added to 2.5 percent, by weight, nonfat milk solution in amounts sufficient to produce a surface tension less than 35 dynes/cm. The nonfat milk/surfactant solutions were then exposed to meltblown polypropylene nonwoven, and analyzed by XPS to determine protein deposition. As summarized in FIG. 11, addition of 250 ppm surfactant is sufficient to completely suppress protein deposition. Although the inventors should not be held to a particular theory of operation, these results offer additional support for the proposed mechanism that unfavorable interfacial energy between the protein solution and polyolefin drives protein adsorption.

Coating Durability

While the addition of surfactant to nonfat milk solutions prior to deposition eliminates protein adsorption to meltblown polypropylene nonwoven web substrates, the coating is quite durable once deposited. The durability of the milk protein modification was tested against several solvents. The only method attempted which allowed for complete and reliable removal of milk proteins from the polypropylene surface was 10 minutes exposure to boiling 1 percent, by weight, sodium dodecyl sulfate solution. The solvents used were water; ethanol; 300 ppm Triton X-102 solution; 0.5M HCl; 5 percent, by weight acetic acid; and 1 percent, by weight, sodium dodecyl sulfate solution. The results are summarized in FIG. 12. The degree of adhesion for the milk proteins with the polyolefin surface is consistent with that suggested by the FESEM images previously discussed FIG. 6.

Milk protein treated nonwovens were soaked in 80 mL deionized water for 24 hours to determine if any surface tension reduction could be measured for the wash solution. As shown in FIG. 13, the surface tension of the water prior to and after sample soaking was measured at 72 dynes/cm, indicating the absence of any β-casein at a concentration of greater than about 5 ppm in the solution after washing.

Coupled with the XPS results which indicate the coatings substantiveness to water wash, these results corroborate that water wettability results from an increase in the surface free energy of the meltblown polypropylene nonwoven web and not from a decrease in the surface tension of the wetting fluid suggesting a durable protein coating. The wettability also occurs in the polka dot pattern observed during staining, which may be favorable in the control of fluid flow in absorbent structures and most likely results from the shear dependence of milk protein deposition.

Shear Dependence

Although the inventors should not be held to any particular theory of operation, it is thought that milk protein deposition onto meltblown polypropylene webs from nonfat milk solution is dependent on shear stress. For a given volume of protein solution, increasing the rate at which the solution penetrates the polyolefin web (decreasing the exposure time) results in an increase shear stress at the fiber/solution interface. Changing the force pushing the fluid through the web is a qualitative method of assessing the effects of shear on protein deposition.

The results of this experiment are shown in FIG. 14. The 300 second time correlates with quiescent exposure, while other exposure times correspond to the amount of time required to pass an aliquot of nonfat milk solution through one layer of nonwoven. An overall increase in coating deposition on the polyolefin surface correlates with a decrease in time that the nonfat milk solution is aspirated through the polyolefin web (i.e., with an increase in shear).

Vacuum extraction (<1 second exposure time) of the nonfat milk solution through the polyolefin web yields XPS-detectable nitrogen of 11% and nitrogen/carbon ratios of 0.15, and has been used as the primary mode of coating deposition. Although the inventors should not be held to a particular theory of operation, shear is hypothesized to improve protein deposition by disrupting the protein equilibrium structure and exposing hydrophobic groups which then readily adsorb to polypropylene.

Foam coating yields an even more favorable deposition (FIG. 14), with 13% nitrogen detected by XPS and nitrogen/carbon ratios of approximately 0.19. The increased deposition using foam coating likely results from a combination of the mechanical stability of the foam and an increase in the number of protein hydrophobic groups exposed at the interface of the solution and the polyolefin substrate.

Figure 15:
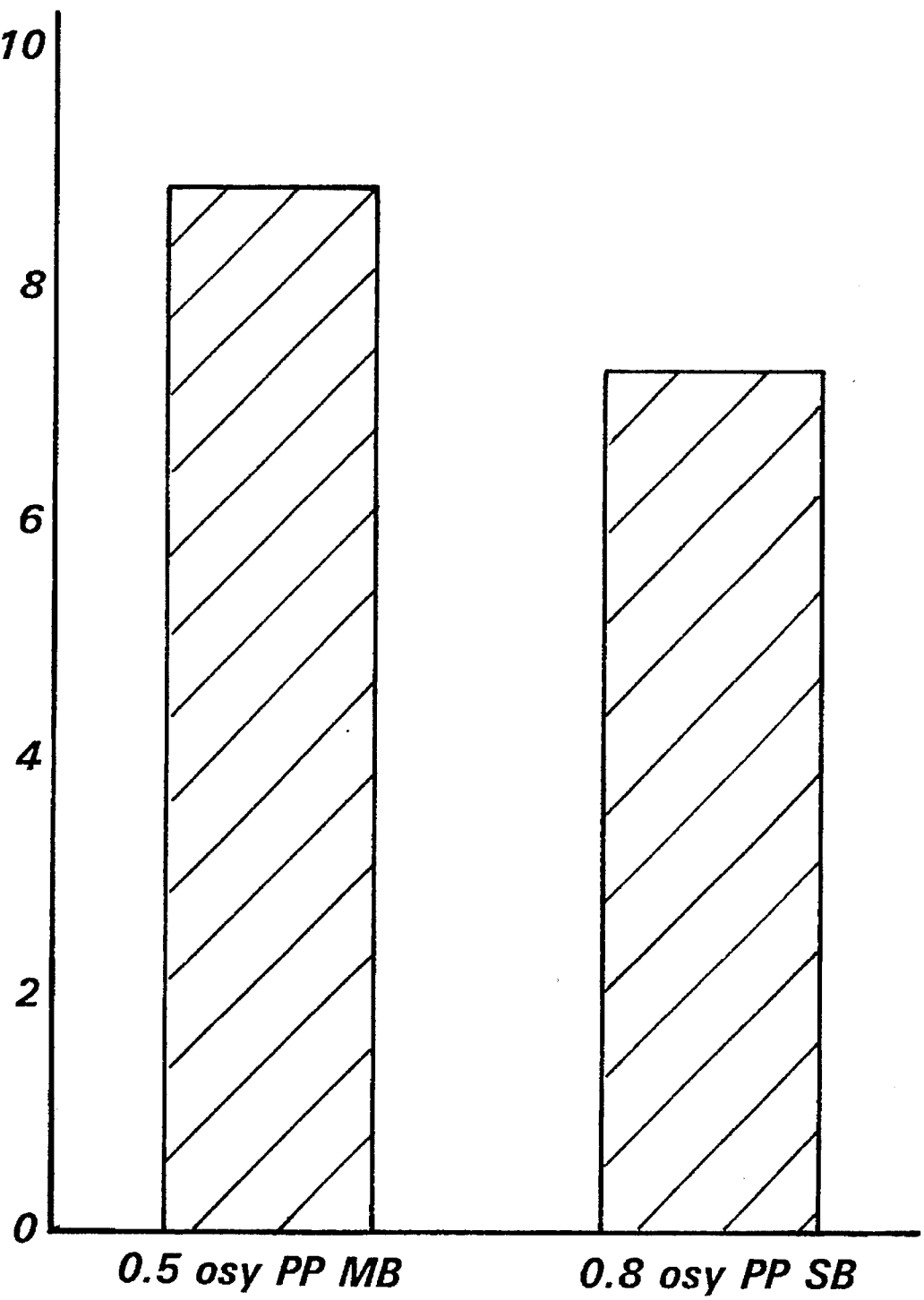
FIG. 15 is an illustration of an exemplary effect of shear forces on protein adsorption onto a permeable sheet.

The shear dependence of the protein deposition is further corroborated by differences in amounts of protein deposition on meltblown polypropylene vs. spunbond polypropylene materials. FIG. 15 illustrates the greater atom % nitrogen detected for protein deposition on 0.5 osy meltblown polypropylene nonwoven web vs. 0.8 osy spunbond polypropylene nonwoven web (8.9% vs. 7.2%, with nitrogen/carbon rations of 0.15 vs. 0.10, respectively). The relatively higher density of the meltblown polypropylene web results in greater shear stresses on the proteins in solution, yielding increased deposition.

While shear has been used to improve overall milk-protein deposition, its effect is also apparent in the polka dot pattern and sidedness observed on milk protein treated samples (See Table 4 and FIG. 8). It is thought that the holes of the Buchner funnel used in deposition create isolated regions of high shear stress which increase protein deposition. A shear gradient is also thought to exist through the depth of the polyolefin nonwoven and results in a sided deposition. This shear dependence appears to permit patterning of protein coatings by simple vacuum extraction methods. The patterning may include, but should not be limited to, the ability to form alpha-numeric characters on the surface of permeable sheet (e.g., nonwoven web) via protein deposition While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

TABLE 1

Representative Composition of Milk[a]

| Component | Weight % | % of SNF Content[b] |
|---|---|---|
| Lipids | 3.6 | — |
| Total Protein | 3.3 | 37.2 |
| Casein | (2.8) | (31.6) |
| Whey | (0.5) | 5.6) |
| Lactose | 4.7 | 53.0 |
| Salts | 0.9 | 9.8 |
| Total SNF | 8.9 | 100.0 |
| Water | 87.5 | |

[a]See, Friberg, S., ed.; "Food Emulsions", Marcel Kekker, New York, 1976.
[b]SNF = solids nonfat

TABLE 2

Concentrations of the Major Milk Proteins[a]

| Protein | Concentration (g/L) | % Total Protein |
|---|---|---|
| Caseins | 24–28 | 80 |
| α-casein | 15–19 | 42 |
| β-casein | 9–11 | 25 |
| α-casein | 3–4 | 9 |
| γ-casein | 1–2 | 4 |
| Whey Proteins | 5–7 | 20 |
| β-lactoglobulins | 2–4 | 9 |
| α-lactalbumin | 1–1.5 | 4 |
| proteose-peptones blood proteins | 0.6–1.8 | 4 |
| serum albumin | 0.1–0.4 | 1 |
| immunoglobulins | 0.6–1.0 | 2 |

[a]See, Fennema, O. R., ed.; "Food Chemistry", Marcel Dekker, New York, 1985.

TABLE 3

Uniformity of Milk Protein Coating on Filter Surface

| Sample Position[a] | % Nitrogen | % Nitrogen/% Carbon |
|---|---|---|
| A | 11.3 | 0.15 |
| B | 11.4 | 0.15 |
| C | 11.3 | 0.15 |
| D | 10.8 | 0.14 |
| E | 10.5 | 0.14 |
| F | 10.5 | 0.14 |
| G | 11.4 | 0.17 |
| H | 11.6 | 0.16 |
| I | 10.4 | 0.14 |
| J | 11.7 | 0.16 |

[a]Sample positions across a 49-mm diameter, milk protein treated, 0.5 osy polypropylene meltblown (PP MB) filter are given below. The analysis was performed on the top side of a second disk exposed to 50 mL 2.5 percent, by weight, nonfat milk solution. The second exposure was used to eliminate the contribution of any mechanically-trapped particles to XPS-detectable nitrogen. Only carbon, nitrogen, and oxygen were detected on the filter surface.

TABLE 4

Sidedness of Milk Protein Deposition on PP MB

| Sample | XPS % Nitrogen | | XPS N/C Ratio | |
|---|---|---|---|---|
| | Top | Bottom | Top | Bottom |
| 0.5 osy[a] | 11.1 | 5.7 | 0.15 | 0.07 |
| | 11.8 | 9.5 | 0.17 | 0.12 |
| 1.5 osy[b] | 11.0 | 6.0 | 0.15 | 0.07 |

[a]Milk protein treated PP MB was made by passing 50 mL of 2.5 percent, by weight, nonfat milk solution through a 49-mm diameter 0.5 osy PP MB disk, followed by a rinse with 200 mL distilled water.
[b]Milk protein treated PP MB was made by passing 1200 mL of 2.5 percent, by weight, solution through a 18.5-cm diameter 1.5 osy PP MB disk, followed by a rinse with 600 mL of distilled water. Surface energies of the 1.5 osy PP MB were 60 dynes/cm and 50 dynes/cm for the top and bottom, respectively.

What is claimed is:

1. A method of coating a permeable sheet with amphiphilic proteins, the method comprising the steps of:
    providing a permeable sheet having a plurality of individual exposed surfaces, at least a portion of which having a surface energy of less than about 45 dynes per centimeter;
    providing an aqueous solution containing amphiphilic proteins, the solution having a surface tension of at least about 45 dynes per centimeter, and
    contacting the solution containing amphiphilic proteins under shear stress conditions with the permeable sheet so that at least a portion of the amphiphilic proteins are adsorbed onto at least some individual exposed surfaces.

2. The method of claim 1, wherein the permeable sheet is a matrix of fibrous material.

3. The method of claim 1, wherein the matrix of fibrous material is selected from woven fabrics, knit fabrics and nonwoven fabrics.

4. The method of claim 1, wherein the permeable sheet is an apertured, film-like material.

5. The method of claim 1, wherein the apertured, film-like material is selected from perf-embossed films, textured apertured films, reticulated apertured films, contoured apertured films, film-nonwoven apertured laminates, and expanded plexi-filamentary films.

6. The method of claim 1, wherein the aqueous solution has an amphiphilic protein concentration of less than about 10 percent by weight.

7. The method of claim 1, wherein the aqueous solution has an amphiphilic protein concentration greater than about 0.01 to about 6 percent by weight.

8. The method of claim 1, wherein the aqueous solution is exposed to shear stress conditions characterized by a Reynold's number of at least about 200.

9. The method of claim 1, wherein the aqueous solution is exposed to shear stress conditions characterized by a Reynold's number of at least about 400.

10. The method of claim 1, wherein the aqueous solution is substantially a foam when contacted with the permeable sheet.

11. The method of claim 1, further comprising the step of washing the coated permeable sheet with an aqueous liquid having a relatively high surface tension.

12. The method of claim 1, further comprising the step of drying the coated permeable sheet material.

13. The method of claim 12, the treated material is dried utilizing infra-red radiation, yankee dryers, steam cans, microwaves, hot-air and/or through-air drying techniques, and ultrasonic energy.

14. The method of claim 11, wherein amphiphilic proteins are adsorbed onto at least some individual exposed surfaces thereby defining a patterned protein coating on the matrix of fibrous material.

15. The method of claim 1, further comprising the step of recontacting the solution containing amphiphilic proteins under shear stress conditions with the permeable sheet so that an additional portion of amphiphilic proteins are adsorbed onto at least some individual exposed surfaces.

16. The method of claim 1, wherein amphiphilic proteins are adsorbed onto a substantial portion of individual exposed surfaces having relatively low surface energies.

17. The method of claim 1, wherein the amphiphilic proteins adsorbed onto at least some individual exposed surfaces define a gradient distribution of amphiphilic protein coating along at least one dimension of the permeable sheet.

18. The method of claim 1, further comprising the step of adding one or more secondary materials to the coated permeable sheet.

19. A protein-coated permeable sheet comprising:
 a permeable sheet having a plurality of individual exposed surfaces, at least a portion of which having a surface energy of less than about 45 dynes per centimeter; and
 amphiphilic proteins adsorbed onto at least some individual exposed surfaces to define a gradient distribution of amphiphilic protein coating along at least one dimension of the permeable sheet.

20. The protein-coated sheet of claim 19, wherein the gradient distribution of amphiphilic protein coating is along at least two dimensions of the permeable sheet.

21. The protein-coated sheet of claim 19, wherein the permeable sheet is a matrix of fibrous material.

22. The protein-coated sheet of claim 21, wherein the matrix of fibrous material is selected from woven fabrics, knit fabrics and nonwoven fabrics.

23. The protein-coated material of claim 22, wherein the nonwoven fabrics are selected from nonwoven webs of meltblown fibers, nonwoven webs of continuous spunbond filaments and bonded carded webs.

24. The protein-coated material of claim 23, wherein the nonwoven web of meltblown fibers further includes one or more secondary materials selected from the group consisting of textile fibers, wood pulp fibers, particulates and superabsorbent materials.

25. The protein-coated material of claim 21, wherein at least a portion of the fibrous material is a bi-component material selected from bi-component fibers and bi-component filaments.

26. The protein-coated sheet of claim 19, wherein the permeable sheet is an apertured, film-like material.

27. The protein-coated sheet of claim 26, wherein the apertured, film-like material is selected from perf-embossed films, textured apertured films, reticulated apertured films, contoured apertured films, film-nonwoven apertured laminates, and expanded plexi-filamentary films.

28. The protein-coated sheet of claim 19, wherein the permeable sheet further includes one or more secondary materials.

29. The protein-coated sheet of claim 19, wherein the permeable sheet is formed from a thermoplastic polymer.

30. The protein-coated sheet of claim 29, wherein the thermoplastic polymer comprises a polymer selected from polyolefins, polyamides and polyesters.

31. The protein-coated sheet of claim 30, wherein the polyolefin is selected from polyethylene, polypropylene, polybutene, ethylene copolymers, propylene copolymers, and butene copolymers and blends of the same.

32. The protein-coated sheet of claim 31 wherein the coated sheet has a critical surface tension of wetting greater than about 45 dynes per centimeter.

33. The protein-coated sheet of claim 32 wherein the coated sheet has a critical surface tension of wetting greater than about 50 dynes per centimeter.

34. The protein-coated sheet of claim 33 wherein the coated sheet has a critical surface tension of wetting greater than about 60 dynes per centimeter.

35. The protein-coated sheet of claim 19, wherein the protein-coated sheet has a basis weight of from about 6 to about 400 grams per square meter.

36. The protein-coated sheet of claim 19 wherein the amphiphilic proteins are adsorbed onto at least some individual exposed surfaces thereby defining a patterned protein coating on the permeable sheet.

37. The protein-coated sheet of claim 19 wherein the coating of amphiphilic proteins uniformly adsorbed onto individual exposed surfaces is present in only discrete portions of the sheet material.

38. The protein-coated sheet of claim 19 wherein the amphiphilic proteins are selected from the group consisting of globular proteins and random coil proteins.

39. The protein-coated sheet of claim 19 wherein the amphiphilic proteins are selected from milk proteins.

40. The protein-coated sheet of claim 19 wherein the amphiphilic proteins are selected from milk caseins.

41. The protein-coated sheet of claim 19 wherein the amphiphilic proteins are β-casein.

42. The protein-coated sheet of claim 19 wherein coating of amphiphilic proteins comprises multiple layers.

43. The protein-coated sheet of claim 19 wherein the thickness of the protein coating ranges from about 1 nanometer to about 1 micron.

44. The protein-coated sheet of claim 43 wherein the thickness of the protein coating ranges from about 5 nanometers to about 900 nanometers.

45. A multilayer material comprising at least two layers of the protein-coated sheet of claim 19.

46. A multilayer material comprising at least one layer of the protein-coated sheet of claim 19 and at least one other layer.

47. The multilayer material of claim 46 wherein the other layer is selected from the group consisting of woven fabrics, knit fabrics, bonded carded webs, continuous spunbond filament webs, meltblown fiber webs, films, apertured films, and combinations thereof.

48. A protein-coated fibrous material comprising:
   a matrix of fibrous material having individual exposed surfaces, at least a portion of which having a surface energy of less than about 45 dynes per centimeter; and
   amphiphilic proteins adsorbed onto at least some individual exposed surfaces to define a gradient distribution of amphiphilic protein coating along at least one dimension of the matrix of fibrous material.

49. A protein-coated film-like material comprising:
   an apertured film-like material having individual exposed surfaces, at least a portion of which having a surface energy of less than about 45 dynes per centimeter; and
   amphiphilic proteins adsorbed onto at least some individual exposed surfaces to define a gradient distribution of amphiphilic protein coating along at least one dimension of the apertured film-like material.

50. A method of coating a permeable sheet with amphiphilic proteins at discrete locations, the method comprising the steps of:
   providing a permeable sheet having a plurality of individual exposed surfaces, at least a portion of which having a surface energy of less than about 45 dynes per centimeter,
   providing an aqueous solution containing amphiphilic proteins, the solution having a surface tension of at least about 45 dynes per centimeter;
   contacting the solution containing amphiphilic proteins under shear stress conditions at discrete locations with the permeable sheet so that at least a portion of the amphiphilic proteins are adsorbed onto at least some individual exposed surfaces within the discrete locations; and
   washing the coated fibrous material with a liquid to define a pattern of protein coating on the permeable sheet.

51. A method of coating a permeable sheet with amphiphilic proteins, the method comprising the steps of:
   providing a permeable sheet having a plurality of individual exposed surfaces, at least a portion of which having a surface energy of less than about 45 dynes per centimeter;
   providing an aqueous solution containing amphiphilic proteins, the solution having a surface tension of at least about 45 dynes per centimeter; and
   contacting the solution containing amphiphilic proteins under shear stress conditions with the permeable sheet so that at least a portion of the amphiphilic proteins are adsorbed onto at least some individual exposed surfaces to define a gradient distribution of amphiphilic protein coating along at least one dimension of the permeable sheet, 52. A protein-coated fibrous material comprising:
   a matrix of fibrous polyolefin material having individual exposed surfaces, at least a portion of which having a surface energy of less than about 45 dynes per centimeter, and
   amphiphilic proteins adsorbed onto at least some individual exposed surfaces to define a gradient distribution of amphiphilic protein coating along at least one dimension of the matrix of fibrous polyolefin material.

* * * * *